United States Patent [19]
Iannello et al.

[11] Patent Number: 5,736,800
[45] Date of Patent: Apr. 7, 1998

[54] LIGHT WEIGHT, HIGH PERFORMANCE RADIAL ACTUATOR FOR MAGNETIC BEARING SYSTEMS

[76] Inventors: Victor Iannello, 2623 Bobwhite Dr., Roanoke, Va. 24018; Richard M. Willis, Jr., 501 Woods Ave., SW., Roanoke, Va. 24016

[21] Appl. No.: 325,099

[22] Filed: Oct. 18, 1994

[51] Int. Cl.$^6$ .................................................. H02K 7/09
[52] U.S. Cl. ...................... 310/90.5; 310/261; 310/268; 310/90
[58] Field of Search .............................. 310/90.5, 90, 261, 310/268, 264

[56] References Cited

U.S. PATENT DOCUMENTS

| | | | |
|---|---|---|---|
| 4,308,490 | 12/1981 | Harbermann et al. | 318/632 |
| 4,387,935 | 6/1983 | Studer | 310/90.5 |
| 4,392,693 | 7/1983 | Habermann et al. | 310/90.5 |
| 4,500,142 | 2/1985 | Brunet | 310/90.5 |
| 4,623,202 | 11/1986 | Shingu | 310/90.5 |
| 4,652,820 | 3/1987 | Maresca | |
| 4,876,491 | 10/1989 | Squires et al. | 310/90.5 |
| 5,019,756 | 5/1991 | Schwarz | 310/90.5 |
| 5,047,715 | 9/1991 | Morgenstern | 310/90.5 |
| 5,053,662 | 10/1991 | Richter | 310/90.5 |
| 5,064,205 | 11/1991 | Whitford | 310/90.5 |
| 5,111,102 | 5/1992 | Meeks | 310/90.5 |
| 5,126,610 | 6/1992 | Fremerey | 310/90.5 |
| 5,153,475 | 10/1992 | McSparran | 310/254 |
| 5,159,246 | 10/1992 | Ueki | 310/90.5 |
| 5,179,308 | 1/1993 | Malsky | 310/90.5 |
| 5,187,434 | 2/1993 | Ando | 310/90.5 |
| 5,193,568 | 3/1993 | Eissenberg et al. | 310/90.5 |
| 5,194,805 | 3/1993 | Nakajima | 310/90.5 |
| 5,214,378 | 5/1993 | Hore | 310/90.5 |
| 5,216,308 | 6/1993 | Meeks | 310/90.5 |
| 5,227,948 | 7/1993 | Boon et al. | 318/632 |
| 5,237,229 | 8/1993 | Ohnishi | 310/90.5 |
| 5,250,865 | 10/1993 | Meeks | 310/90.5 |
| 5,262,692 | 11/1993 | Williams et al. | 310/90.5 |
| 5,287,031 | 2/1994 | Akiba et al. | 310/90.5 |
| 5,300,841 | 4/1994 | Preston et al. | 310/90.5 |
| 5,300,842 | 4/1994 | Lyons et al. | 310/90.5 |
| 5,304,876 | 4/1994 | Lemarquand et al. | 310/90.5 |
| 5,315,197 | 5/1994 | Meeks et al. | 310/90.5 |
| 5,317,226 | 5/1994 | New | 310/90.5 |
| 5,319,273 | 6/1994 | Hockney et al. | 310/90.5 |
| 5,386,166 | 1/1995 | Reimer et al. | 310/90.5 |
| 5,455,472 | 10/1995 | Weiss et al. | 310/90.5 |

OTHER PUBLICATIONS

Mizuno et al. (Literature Reference) "Towards Practical Applications of Self-Sensing Magnetic Bearings".
Okada et al. (Literature Reference) "Sensorless Magnetic levitation Control by Measuring the PWM Carrier Frequency Component".
FR2581-462-A "Control circuit for magnetic bearing—uses current generation to supply coils of opposing electromagnets and direct measurement of electromagnetic force for feed back" by Jeumont Schneider.

*Primary Examiner*—Steven L. Stephan
*Assistant Examiner*—Elvin G. Enad
*Attorney, Agent, or Firm*—Robert E. Bushnell, Esq.

[57] ABSTRACT

A magnetic bearing and positioning system provides a radial actuator for positioning a shaft without mechanical contact between the actuator and the shaft. As disclosed, the actuators use a homopolar structure without slots between the poles and with the poles of the magnetic bearing being at the same polarity at a given axial position, thereby advantageously reducing hysteretic and eddy current losses in the rotor material.

42 Claims, 10 Drawing Sheets

LIGHT WEIGHT, HIGH PERFORMANCE RADIAL ACTUATOR FOR MAGNETIC BEARING SYSTEMS

BACKGROUND OF THE INVENTION

1. Technical Field

The present invention pertains to active magnetic positioning systems generally and more specifically, to homopolar radial actuators serving as magnetic bearings and to processes for positioning a moveable member without contact between the bearings and the moveable member.

2. Background Art

Active magnetic bearings (see, for example, *Linear Magnetic Bearing,* U.S. Pat. No. 4,387,935 by Philip A. Studer and *Magnetic Bearing And Motor,* U.S. Pat. No. 4,381,875 by Philip A. Studer) have been used in an increasing number of applications for functions such as providing contactless support for a moveable body like a rotating shaft, and as other servo-positioners. These applications depend upon the magnetic bearing system to control magnetic fields in and around the body (typically a rotating shaft) being supported.

With active magnetic bearings, the body may be supported without mechanical contact. Consequently, there is no mechanical wear between the body being supported and the bearing, frictional losses are small, and the necessity for lubricants is eliminated. Reduced maintenance requirements and extended life of the bearings can concomitantly reduce the overall life-cycle cost of the host machine while enabling use of rotating equipment to operate in hostile environments such as in extremely low or very high temperatures, in a vacuum and in corrosive media. Magnetic bearings are therefore particularly suited for use in machines having a reciprocating or rotating component such as a shaft, and may be used in pumps, compressors, turbines, motors, fans, turbo-expanders and in spindles. Often, magnetic bearings permit operation at rotational speeds higher than would otherwise be practical using conventional mechanical bearings.

Magnetic bearing and positioning systems have two principal components: the actuator that serves as the bearing or positioner, formed with a plurality of coils, stators and magnets, and a controller circuit that regulates electrical currents flowing through the coils in order to adjust the resulting magnetic forces imparted to the member being supported, or positioned, and thereby continuously control the position of the object being supported, or positioned by the actuator. Contemporary designs of the bearing or positioning actuators tend to be bulky in both size and mass; additionally, the configurations of the bias and control coils as may be seen in the *Magnetic Bearing Structure* by C. R. Meeks illustrated in U.S. Pat. No. 5,111,102 and the *Magnetic Bearing Structure Providing Radial Axial And Movement Load Bearing Support For A Rotatable Shaft* also by C. R. Meeks in U.S. Pat. No. 5,126,308, tend to rely upon radially polarized structures characterized by not insubstantial hysteretic and eddy current losses. Such contemporary designs also require massive pole pieces and intricate machining of the pole pieces for example, to form perforations orientated to accommodate placement of the windings for the coils. Moreover, the configuration and mass of the pole pieces undesireably contributes to cross-coupling of flux paths between the axes. Furthermore, the intricacy in design of the pole pieces increases fabrication expense as well as the difficulty and labor of assembly. Beyond this, we have found that the design provided by Meeks '102 and '308, like other conventional designs, depends upon slotted stators, characterized by both slotted bores and by electrical coil windings wound about, or interwoven with, the stators through the slots.

The controller circuit for active magnetic positioning may, in my opinion, also be used in other applications, regardless of whether such other applications have complete magnetic suspension of a body. For instance, a diaphragm may be magnetically positioned in a continuous and cyclical manner to effect compression or expansion of a working fluid. In another application, magnetic forces may be used to precisely position a rotating member relative to a stationary member so that a compartment may be sealed. A clearance seal so designed, would eliminate the need for sealing fluids such as oil, as well as the wear associated with packing and mechanical seals. Unlike a dry gas seal that relies upon hydrodynamic gas forces to position sealing surfaces, the performance of the seal would be independent of gas properties such as density, viscosity and moisture content, and would consequently perform relatively independently of the speed of the rotating member.

Separately from the earlier noted flaws in designs of contemporary actuators, and even though the advantages of active magnetic positioning systems are numerous, the systems are encumbered by the need for a sensing system to detect the position of the member. See for example, the radial position sensors required by the *Magnetic Bearing Structure* in C. R. Meeks '102 and the *Magnetic Bearing Structure Providing Radial, Axial And Moment Load Bearing Support For A Rotatable Shaft* of Meeks '308. For each axis of the member sought to be actively controlled in contemporary designs of positioning systems, at least one sensor is required to complete the feedback positioning control loop. These sensors and their associated circuitry increase the size, weight, cost and complexity of the magnetic positioner. This, I have noticed, is especially true if the member that is to be positioned is flexible (e.g., a rotating shaft) so that some of the structural bending modes become de-stabilized due to the variance between the positions of the sensor and actuator. The Meek '102 patent describes a *Magnetic Bearing Structure* with the structure arranged to provide a constant magnetic flux that is axially polarized and provided by either permanent magnets or electromagnetic coils superimposed with a variable flux that is radially polarized. Separate position sensors are needed to provide input to the servo control circuit. These sensors are spaced apart from the electromagnets however.

Okada, et al., in *Sensor-Less Magnetic Levitation Control By Measuring The PWM Carrier Frequency Component* published in the *Proceedings of the 3rd International Symposium On Magnetic Bearings,* Technomic. Lancaster, Pa. (1992), describes a sensorless magnetic positioner with the carrier frequency component of the current supplied by a switching amplifier used to detect the position of a magnetically supported member. This approach requires the use of resonant circuits and active filters, and could only be made stable under a limited range of conditions. Moreover, the filters required reduce the bandwidth of the detection system and thereby degraded the stability of the servo loop. I have observed however, bandwidth is critical for magnetic bearing applications because stability results from electronic phase lead (that is, by damping) introduced by the control circuitry. Consequently, this system has limited usefulness in many applications.

Mizuno, et al., in his paper titled *Towards Practical Applications Of Self-sensing Magnetic Bearings,* published in the *Proceedings of the 3rd International Symposium On Magnetic Bearings,* Technomic, Lancaster, Pa. (1992), describes a sensorless magnetic bearing with a space-state model of the shaft bearing system used to eliminate displacement and velocity of the supported shaft. Voltages occurring across the electromagnets are controlled and the resulting currents are measured in order to estimate the shafts position using a space-state model. It seems to me therefore, that this bearing's performance is limited by the accuracy of the space-state representation of the actual plant, because the position of the shaft is only estimated. I note that in many practical applications such as for high-speed flexible shafts, an accurate plant model is difficult to obtain and is computationally intensive. Mizuno reported that when compared to conventional magnetic bearings using sensors, it was more difficult using self-sensing magnetic bearings to adjust the controller in order to obtain adequate performance, due to the increased complexity of the controller for the self-sensing bearings.

SUMMARY OF THE INVENTION

It is therefore, an object of the present invention to provide improved magnetic bearing and positioning systems and processes.

It is another object to provide a magnetic bearing system and process simplifying manufacture, assembly and erection of the system.

It is still another object to provide an active magnetic bearing system that eliminates a need for a dedicated position sensor.

It is yet another object to provide an active magnetic bearing system and process using a closed feedback loop having no dedicated position sensor.

It is still yet another object to provide an active magnetic bearing system enabling collocated position sensing.

It is an additional another object to provide a more compact active magnetic bearing system.

It is a further object to provide an active magnetic bearing system exhibiting enhanced controllability.

It is a still further object to provide an active magnetic bearing system requiring a lower degree of tuning.

It is a yet further object to provide a more compact active magnetic positioning device.

It is a still yet further object to provide an active magnetic positioning device operating with a reduced number of electrical conductors.

It is also an object to provide a less complex and more reliable active magnetic bearing system.

It is also a further object to provide an electromagnetic positioning system that effectively enables sensing of the position of a mass being supported by an electromagnet at a location coinciding with the precise location of the electromagnet.

It is also a yet further object to provide homopolar radial actuators for magnetic bearings and positioners.

It is also a still further object to provide a magnetic bearing exhibiting an increased effective pole area.

It is also a still yet further object to provide a magnetic bearing characterized by a reduction of eddy current losses and hysteretic effects in the rotor.

It is an additional object to provide a magnetic bearing amenable to manufacture with slotless stators.

It is a yet additional object to provide a magnetic bearing producing a more uniform flux field around the circumference of a rotor.

It is a still additional object to provide a magnetic bearing exhibiting an enhanced load bearing capacity.

It is a still yet additional object to provide a magnetic bearing having a smooth bore stator.

These and other objects may be achieved in accordance with principles of the present invention by positioning a plurality of axially laminated stators of ferromagnetic material that are axially spaced-apart along a longitudinal axis to define a central bore centered upon the longitudinal axis. Each of the stators is constructed to provide a plurality of poles symmetrically arrayed around the bore with all of the poles in any one of the stators instantaneously exhibiting a single polarity. The stators define a central path for lines of flux extending through the bore, and define a plurality of radial paths for the lines of flux extending radially outwardly from the bore and through the stators. Each of the stators provides magnetic isolation between each of the radial flux paths within corresponding different sectors of the stators while accommodating (i.e. coupling) the lines of flux extending through the bore within the radial paths. A plurality of armatures are radially spaced-apart from the bore and extend axially between radially outward segments of the different sectors of neighboring stators, to provide axial couplings of the lines of flux between the stators by forming a plurality of arcuately separated parallel axial flux paths aligned approximately parallel to the longitudinal axis and extending between axially aligned pairs of the radial flux paths through the stators, while preserving magnetic isolation of lines of flux between different sectors of each of the stators. A plurality of bias coils are symmetrically arrayed around the bore to induce the lines of flux and thereby provide axial polarization of the stators.

These and other objects may be achieved in accordance with another aspect of the present invention, with a circuit and a process for actively controlling the position of an object using magnetic forces without mechanical contact. Electromagnets variously formed by the bias coils, control coils, stators and armatures of a magnetic bearing or seal, are placed in an ordered array surrounding an object to be suspended, to impart magnetic forces toward the object while simultaneously detecting the position of the object in accurate registration with the position of the corresponding electromagnets. In one embodiment constructed according the principles of the present invention, the currents through the electromagnets are controlled by switching amplifiers that switch the supply amplitudes of the voltages applied across the control coils. With two or more electromagnets coupled electrically in series, the absolute magnitude of the voltage developed across a control coil indicates its relative inductance. The position of the object being supported along an axis may be detected by comparing the absolute magnitude of the voltage drops across the two electromagnets located on either side of the member and along that axis, because the inductance of the electromagnet varies with its distance from the supported member.

In another embodiment constructed according these principles, a single electromagnet is placed electrically in series with a reference coil and the absolute magnitude of the voltage across the reference coil may be used to detect the position of the member being supported.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 2:
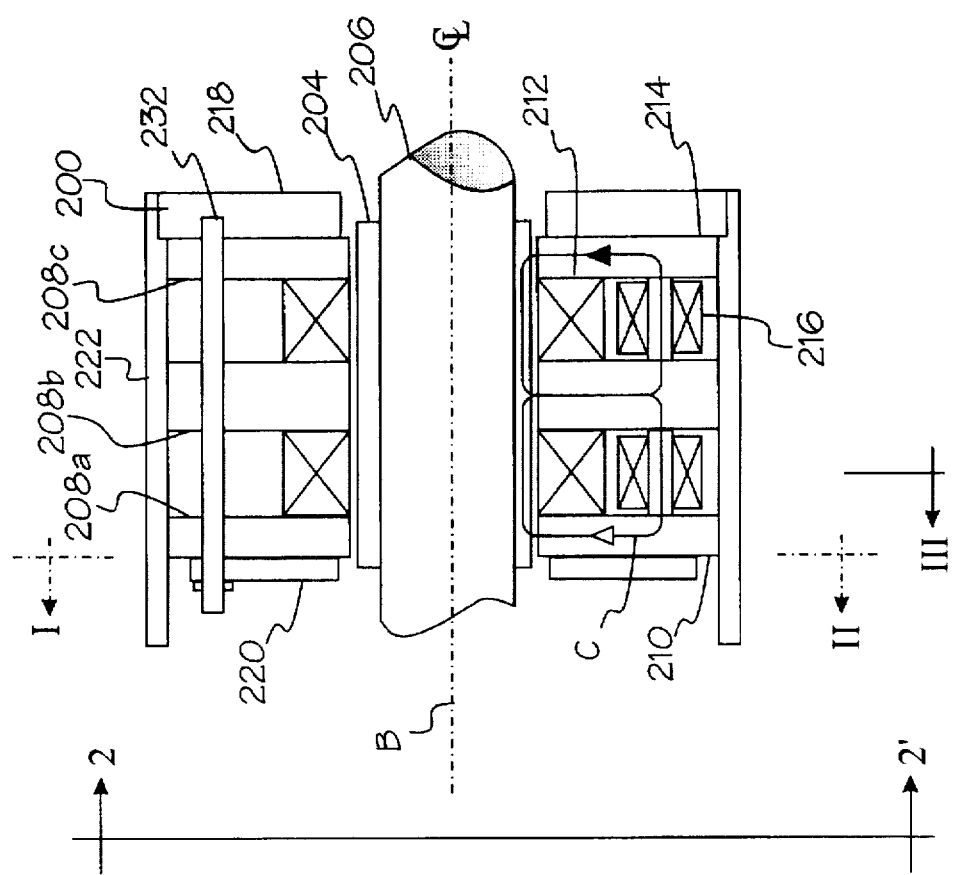
FIG. 2 is a sectional side elevational view of the embodiment shown in FIG. 1, with upper and lower sections taken along different radials 2,2' (radial planes), showing the relations between the layers I, II and III in FIG. 1.

Referring now to the drawings, the several figures show configurations using complementary arrangements of electromagnets and independently controlled electromagnets. In the context of the present invention the term "axial" always means "along the axis of the shaft" while the term "radial" means around the circumference of the sides of the shaft. In the following description, coils are shown along a single axis. It should be understood however, that generally it would be desirable in the practice of the foregoing principles to provide stability by restraining five degrees of shaft freedom. These are the radial dislocation of the shaft with respect to mutually orthogonal X and Y axes, tilting of the shaft with respect to either of the X or Y axes, and axial shifting of the shaft along its longitudinal axis.

As explained in conjunction with the description of the following embodiments, a low-ampere rated amplifier may be used to supply the bias currents in all of the bias coils in each of the radial bearing actuators or seals described, because the currents in the bias coils are constant. In particular configurations, diametrically opposite bias coils may be electrically coupled in a series opposing configuration to produce diametrically opposite bias forces, and driven by the same amplifier, as is shown hereinafter in the circuit provided by FIG. 14, where $B_1$, $B_2$ represent the bias coil windings. Current through the control coils forming electromagnets $L_1$, $L_2$, should be controlled according to the position of the rotating, or reciprocating, shaft supported by the bearing actuator. In the following embodiments, the position of the shaft may be actively controlled using the configurations of these embodiments without the necessity of discrete sensors to determine the instantaneous position of the shaft.

Radial Bearing Actuator

Figure 1:
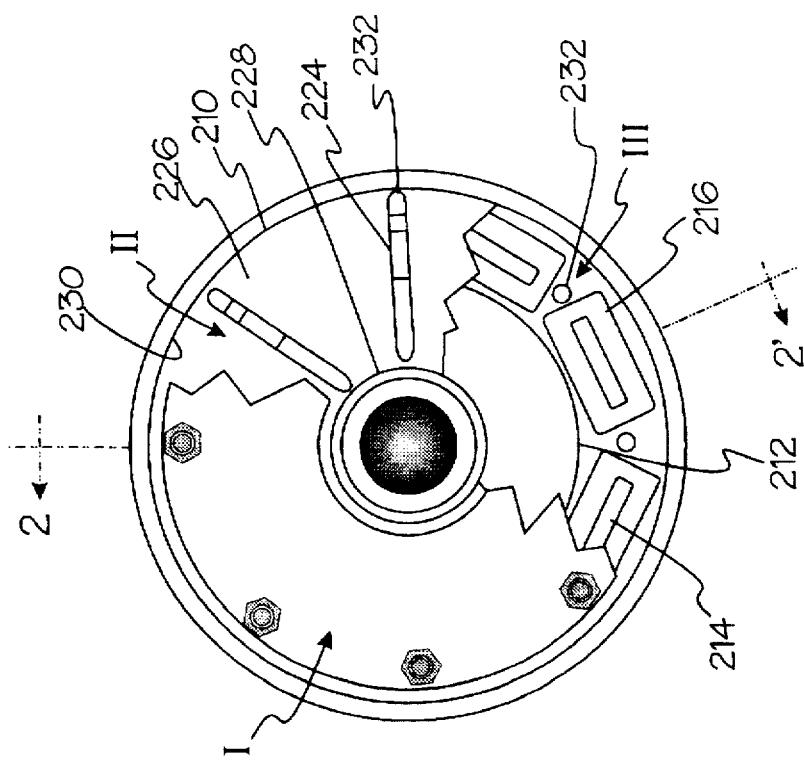
FIG. 1 is a layered, partially sectional elevational view showing the relation between stators, bias coils and control coils of an embodiment of the actuator for a magnetic bearing constructed accordingly to the principles of the present invention, with layers labeled as I, II, and III.

Turning now to FIGS. 1 and 2, a stationary magnetic actuator 200 may be constructed to provide a central bore 202 accommodating rotation of a rotor 204 upon a rotating shaft 206 having a longitudinal axis B extending through the length of bore 202. Preferably, actuator 200 maintains longitudinal axis B coaxially positioned upon center line ¢. Actuator 200 is constructed with three spaced-apart stacks 208a, 208b and 208c of laminated stator disks 210. Preferably, the axial thickness of the center stack 208b is approximately twice the thickness of stacks 208a, 208c, so as to provide a sufficient radial flux path. A continuous circularly wound (i.e., solenoidal) bias coil 212 is co-axially positioned upon center line ¢, between each pair of neighboring stator stacks 208a, 208b and 208b, 208c.

Pairs of axially aligned stator bars 214 are positioned radially outwardly and spaced-apart from corresponding ones of the bias coils 212, between pairs of stator stacks 208a, 208b and 208b, 208c. As best illustrated by the partial view the layers III in FIG. 1, stator bars 214 are arranged in a symmetric array extending around bore 202, but are radially separated from bore 202 by bias coils 212. In each of the two arrays of stator bars 214, the bars 214 are arcuately spaced-apart in a circular array coaxially centered upon centerline ¢. The longitudinal axis of each of the stator bars is aligned parallel to, but radially spaced apart from center line ¢. Each stator bar 214 supports its own continuous circularly wound control coil 216.

The assembly of actuator 200 is constructed with stator disks forming stacks 208a, 208b, 208c, and with those stacks being spaced-apart by intermediate bias coils 212 and stator bars 214 bearing control coils 216. The stacks 208a–208c are held together between a base plate 218 and clamp plate 220 by a plurality of posts 232 extending axially between, and threadingly engaging base plate 218 and clamp plate 220. A cylindrical outer shell 222 is, except for bore 202, closed at one end by base plate 212; shell 222 encloses the assembly of stacks 208a, 208b, 208c to form the completed actuator 200.

As seen in the partial view of layer II, a plurality of radial slots 224 axially perforate each of the stator disks 210. The radial length of the each slot 224 is slightly less than the radial dimension of the corresponding stator disk 210; consequently, each arcuate sector 226 of each stator disk 210 is connected to its neighboring arcuate sectors 226 by only a thin, radially inward web 228 and a thin radially outward web, 230 comprising perhaps less than one-tenth of the radial width of the disk. Each slot 224 may accommodate unobstructed passage of a corresponding post 232 between base plate 218 and clamp plate 220 and thereby eliminate a need for a step of drilling the stacks 208 during manufacture to provide for passage of post 232. When axially aligned in each stack 208a, 208b and 208c, radial slots 224 tend to concentrate the passage of flux within individual arcuate sectors 226 as the flux passes radially between an adjoining stator bar 214 and rotor 204. This geometry also tends to focus the flux within the bore 202 of the stator, thereby advantageously increasing the lead capacity while reducing the affects of flux leakage. Stacks of the laminated stator disks are easily manufactured by stacking, machining the radial slots 224 and turning the inner and outer diameters of the stacks on a lathe. Alternatively, if waste material from the center of the stator is used to assemble rotor 204 as a single stack of circular laminations, the inner diameter of the stator disk 210 may be cut out with electrical discharge machinery. Each laminated stator disk 210 may also be stamped.

Bias coils 212 induce bias fields represented by flux lines C. Bias coils 212 are wound as continuous, circular coils, as shown in the layer represented by view provided between sectional lines I–III. The use of two separate, spaced-apart bias coils 212 facilitates manufacture while reducing $I^2R$ losses within the bias coils.

A different control coil 216 is circularly wound around each one of the stator bars 214. The flux induced by the control coils 216 adds to, or subtracts from, the bias flux established by bias coils 212, such that the flux in each sector of the stator stacks 208a, 208b, 208c may be controlled. Preferably, the polarity of each pole formed by an arcuate sector or arm of a stator is determined by the corresponding bias coils cooperating with the stator, while the magnitude of the flux field produced by the electromagnet formed by the stator, armature and their cooperating bias and control coils, is varied by changes in electrical current through the control coil cooperating with the electromagnet that are imposed by a control circuit responding to displacement of the shaft being supported. The arcuate sectors 226 of the stator disk are grouped into quadrants with the control coils 216 that are positioned diametrically opposite to each other along a transverse diametric axis being electrically connected in series to provide control current adding to the bias flux on one side of the shaft while subtracting from the bias flux on the diametrically opposite side of the shaft. In this manner, a net resulting couple may be effected along the transverse diametrically axis by using a single amplifier, 20, 80, 90, 92 as shown for example, in the circuits of FIGS. 8 through 14 described in the following paragraphs.

The volt-amp rating of the amplifier used to supply the bias currents may be small because the currents in the bias coils 212 are constant. Consequently, the amplifier is relatively inexpensive. The use of two bias coils coupled electrically in series enables each pair of bias coils to be driven by a single amplifier. Moreover, it is possible to drive the bias coils of other bearing actuators from the same amplifier.

The simplicity of the stator bars and control coils allows economic manufacture of actuator 200. The necessity of machining intricate stator configurations and of sliding coils into slots is also eliminated by the design of actuator 200. The coils may be wound and potted externally to the stator prior to the assembly. The configuration of actuator 200 also lends itself to use with wires coated with delicate insulation, such as ceramic enameled wire used in high temperature applications. Preferably, stator bars 214 are laminated. Although the particular configuration of actuator 200 shown in FIGS. 1 and 2 contemplates eight arcuate sectors 226 and eight arcuately-spaced-apart control coils 216, with each one of the control coils 216 positioned between a neighboring pair of slots 224, actuator 200 may be constructed with a plurality of radial slots 224 dividing each stator disk 210 into a different number of arcuate sectors 226 of the stators, and a correspondingly different number of stator bars 214 and cooperating control coils 216. These embodiments may also be constructed with more than the two axially separated bias coils and three stator stacks, simply by, for example, adding a third bias coil, a third array of control coils and their cooperating armatures adjacent to laminated stator stack 208c, supplementing the width (i.e. adding additional stator disks) of stator 208c, and adding a fourth stator 208(d) (not shown). These three bias coils may be coupled in electrical series across a single bias potential, with the intermediate bias coil wound in one direction and the two end bias coils wound in the same direction, opposite to the direction of winding of the intermediate bias coil.

Radial Bearing Actuator With Two Flux Rings

Figure 4:
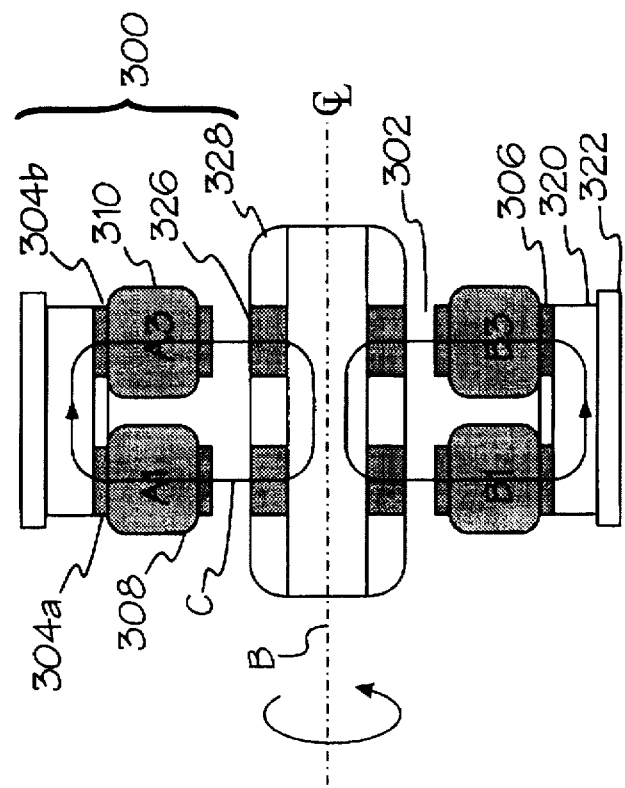
FIG. 4 is a sectional side elevational view of the embodiment shown in FIG. 3, taken along section lines IV—IV.
Figure 3:
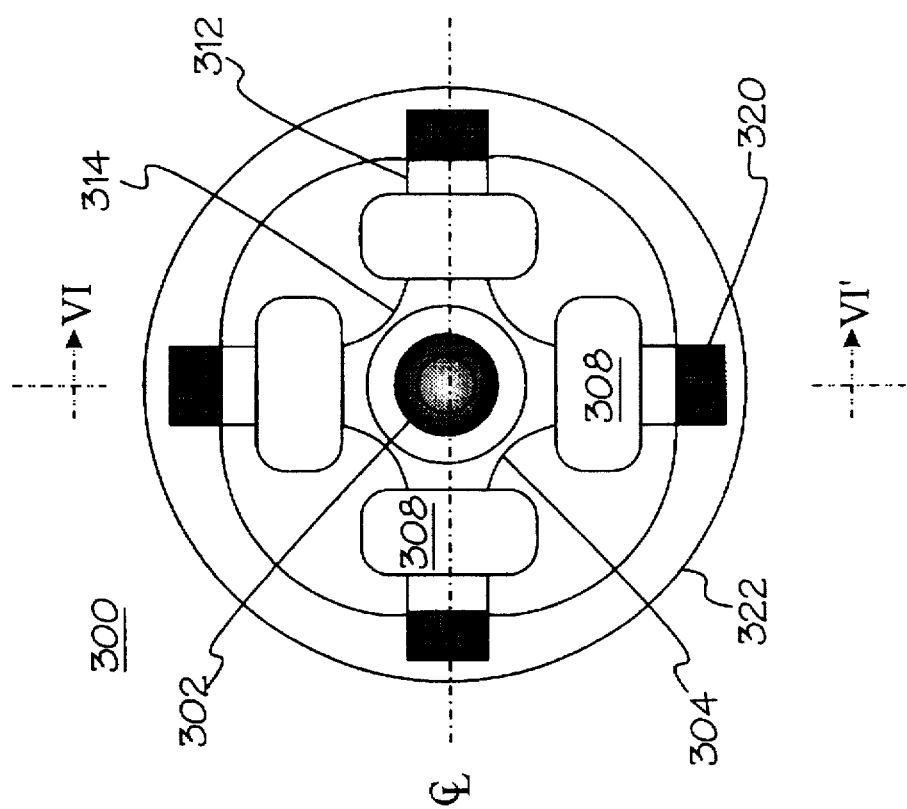
FIG. 3 is a cross-sectional elevational view of a second embodiment of an actuator of a magnetic bearing constructed according to the principles of the present invention.

Turning now to FIGS. 3 and 4, an alternative configuration provides a radial bearing actuator using two flux rings, with stationary magnetic actuator 300 using U-shaped magnets, is illustrated. This configuration advantageously minimizes the axial extent of the bearing, albeit with a concomitant allowance for its radial extent. Actuator 300 provides a cylindrical, central bore 302 providing a centrally positioned axis B along centerline C̵. Two stacks 304 of laminated stator disk 306 define bore 302. Stacks 304a, 304b are axially spaced-apart to respectively accommodate axial aligned placement of control coils 308 and bias coils 310. The stator disks 306 forming the stacks are shaped as unitary structures providing a plurality of radial arms 312 extending outwardly from centerline C̵. The thin web 314 between neighboring pairs of radial arms 312 tends to magnetically isolate the flux within the sectors of the stator formed by radial arms 312.

Control coils 308 and bias coils 310 are continuous circular (i.e., solenoidal) coils having centroids positioned on the radial axis of the corresponding radial arm 312. A circular spacer 316 is positioned between stacks 304a, 304b, to assure adequate separation between the stacks and the axially aligned control coils 308 and bias coils 310. Laminated armatures 320 extend axially through slots cut into a cylindrical casing 322 in order to provide flux paths between axially aligned distal ends of the radial arms 312 of stacks 304a, 304b. Casing 322 encircles and forms a housing around actuator 300. Bore 302 accommodates insertion of a rotating shaft 324. The axial spacing of stacks 304a, 304b provide radial flux paths between the lamination 326 formed in the rotor 328 mounted upon shaft 324, and armatures 320. This configuration tends to focus the flux within bore 302 of the stator, thereby enabling an enhanced load capacity while reducing affects of flux leakage. Stacks of the laminated stator disks may be easily manufactured by stacking, machining the radial arms 312 and turning the bore 302 of the stacks on arrays. Alternatively, remanents cut from the bore 202 formed in the stacks may be used to form laminations 326 of rotor 328.

The flux induced by control coils 308 adds to, or subtracts from the bias flux established by bias coils 310 as the flux travels in radially opposite directions along flux paths C through each pair of axially aligned pairs of radial arms 312 of stacks 304a, 304b.

Canned Magnetic Bearing

Figure 6:
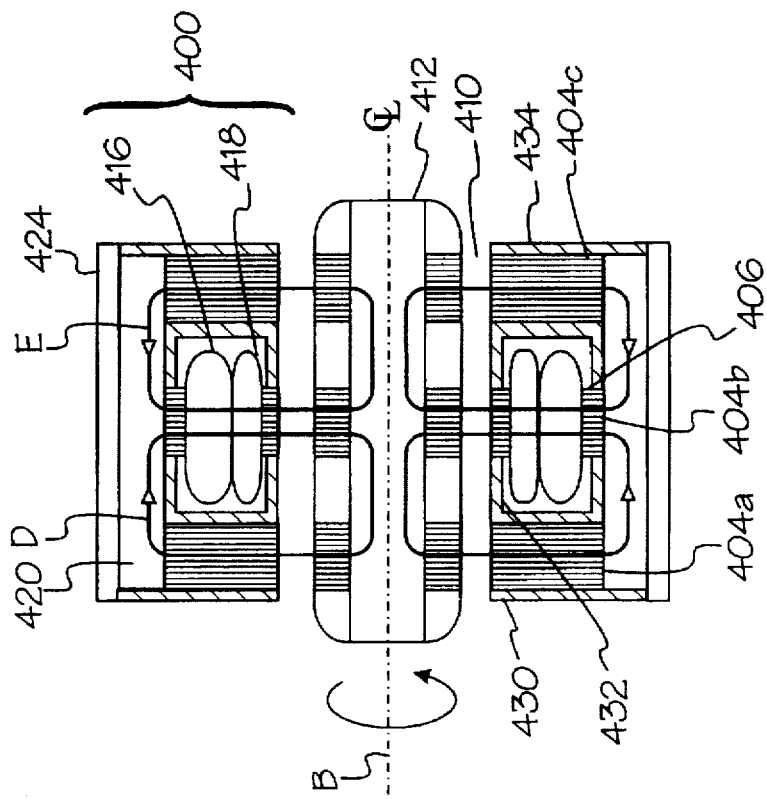
FIG. 6 is a sectional side elevational view of the embodiment shown in FIG. 5 taken along section line VI—VI.
Figure 5:
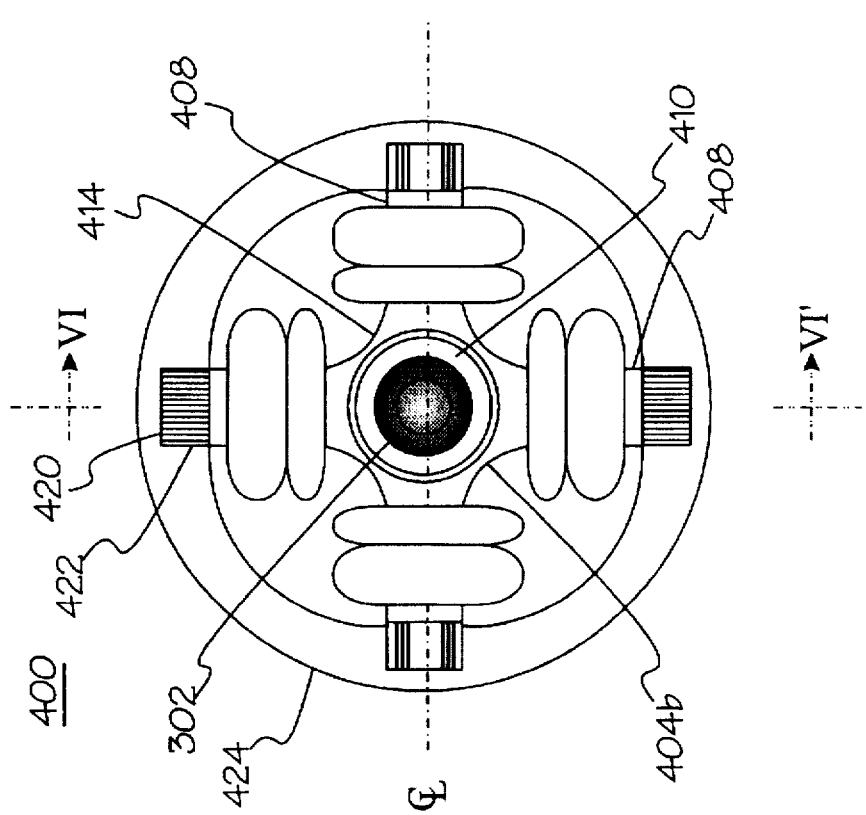
FIG. 5 is a cross-sectional elevational view of a third embodiment of an actuator of a magnetic bearing constructed accordingly to the principles of the present invention.

FIGS. 5 and 6 illustrates an alternative configuration of an actuator 400 for a magnetic bearing. In this embodiment, three axially separated stator stacks 404a, 404b, 404c are shaped to provide a plurality of outwardly extending radial arms 408 with a central bore 410 coaxially perforating each of the three stacks to accommodate a rotating shaft 412. The thinness of the webs 414 formed between the concave, radially outward portion of each stator disk extending between neighboring radial arms 408 tends to concentrate the passage of flux within the individually sectors of the stator stacks formed by the radial arms, as the flux travels radially along flux path C between bore 410 and axially extending laminated armatures 420 formed within slots 422 in the interior surfaces of casing 424. In effect, axially extending armatures 420 adjoining the radial arms of the stator stacks, provides an E-shaped stator for actuator 400.

Each radial arm of the centermost stator stack 404b supports one bias coil 416 and one control coil 418. Bias coils 416 are continuously circularly wound with a centroid positioned upon the radial axis of the corresponding arm 408. Each control coil 418 is continuously, circularly wound with a centroid of each coil positioned upon the radial axis of the corresponding arm 408, but radially inwardly from the centroid of the neighboring bias coil 416 mounted upon the same arm 408. Bias coils 416 established oppositely directed circular flux paths D, E passing radially through the centermost stack 404b to the two outer stacks 404a, 404c via lamination 426 of rotor 428 and shaft 412, and via laminated armatures 420 extending axially between the radial outward distal ends of radial arms 408. The flux induced by control coils 418 either adds to, or subtracts from, the bias flux established by bias coils 416, in order that the flux through each sector of the stator stacks 404a, 404b, 404c may be controlled. The arcuate sectors of the stacks formed by the radial arms 408 are grouped into quadrants (assuming that the stator has four radial arms, or octan) with the control coils 418 that are positioned diametrically opposite along a transverse diametric axis being electrically connected in series to provide control current adding to the bias flux on one side of the shaft, while subtracting the bias flux on the diametrically opposite side of the shaft. In this manner, a net resulting couple may be created along the transverse diametric axis using a single amplifier.

In the embodiment shown in FIGS. 5 and 6, the windings of control coils 418 and bias coils 416 of the bearing may be sealed from contact with fluid that may be present in the gap formed in the bore 410 between the stator and rotor. This embodiment enables use of a liner 430 within the bore fitted into the stator in the gap between the stator and rotor. The slotless configuration of the stator offers advantages for this geometry because the liner is continuously supported by the laminations of the stator stacks 404a–404c for the entire circumference of bore 410. This configuration contrasts with contemporary slotted bore designs with a liner that is unsupported within the winding slots. Moreover, in the configuration shown in FIGS. 5 and 6, the liner 430 may be made thinner because of the additional support provided by the stacks. This feature of the embodiment shown is advantageous because in the contemporary designs the liner 430 increases the required ampere-turns in both the bias and control coils, and, if the liner is sufficiently thick, the liner makes the bearing extremely difficult to control due to the occurrence of eddy current effects. A pair of support rings 432 may be positioned between the axially spaced-apart stacks to support the liner. End plates 434 are welded at the ends of the bearing actuator 400 to complete a sealed end "canned" magnetic bearing assembly.

The magnetic bearing and positioning system described in the foregoing paragraphs provides a radial actuator for positioning a shaft without mechanical contact between the actuator and the shaft. As described, the actuators use a homopolar structure without slots between the poles and with the poles of the magnetic bearing being at the same polarity at a given axial position, thereby advantageously reducing hysteretic and eddy current losses in the rotor material. The magnetic bearing actuators shown in FIGS. 1 through 6 and described in the foregoing paragraphs all may be constructed with smoothbore stators 208a, 208b, 208c, 304a, 304b, 404a, 404b and 404c, defining the central bores respectively 202, 302 and 410. Unlike contemporary designs, these stators, whether assembled from stacks of a plurality of laminated disks )as, for example, each of the disks being a single member unitary, monolithic plate) or made as unitary monolithic structures, have continuous circular interior circumferential surfaces defining respective bores 202, 302 and 410. Stators 208a, 208b and 208c also have continuous circular exterior circumferential surfaces. We have discovered that these smoothbore stators increase the effective pole area and concomitantly increases the lead bearing capacity of the actuator because the absence of slots between the poles and with the poles of the magnetic bearing being at the same polarity at a given axial position substantially reduces hysteretic and eddy current losses in the rotor material. We have also found that the slotted bore stator design of contemporary devices substantially and undesirability increases the variability of the flux field around the circumference of the rotor because the flux will fall off to nearly zero near the slot. In contrast to such contemporary slotted bore stators of contemporary designs, the slot-less, or smoothbore stator shown in FIGS. 1 through 6, will produce a more uniform flux field around the circumference of the rotor.

Active Magnetic Seal

Figure 7:
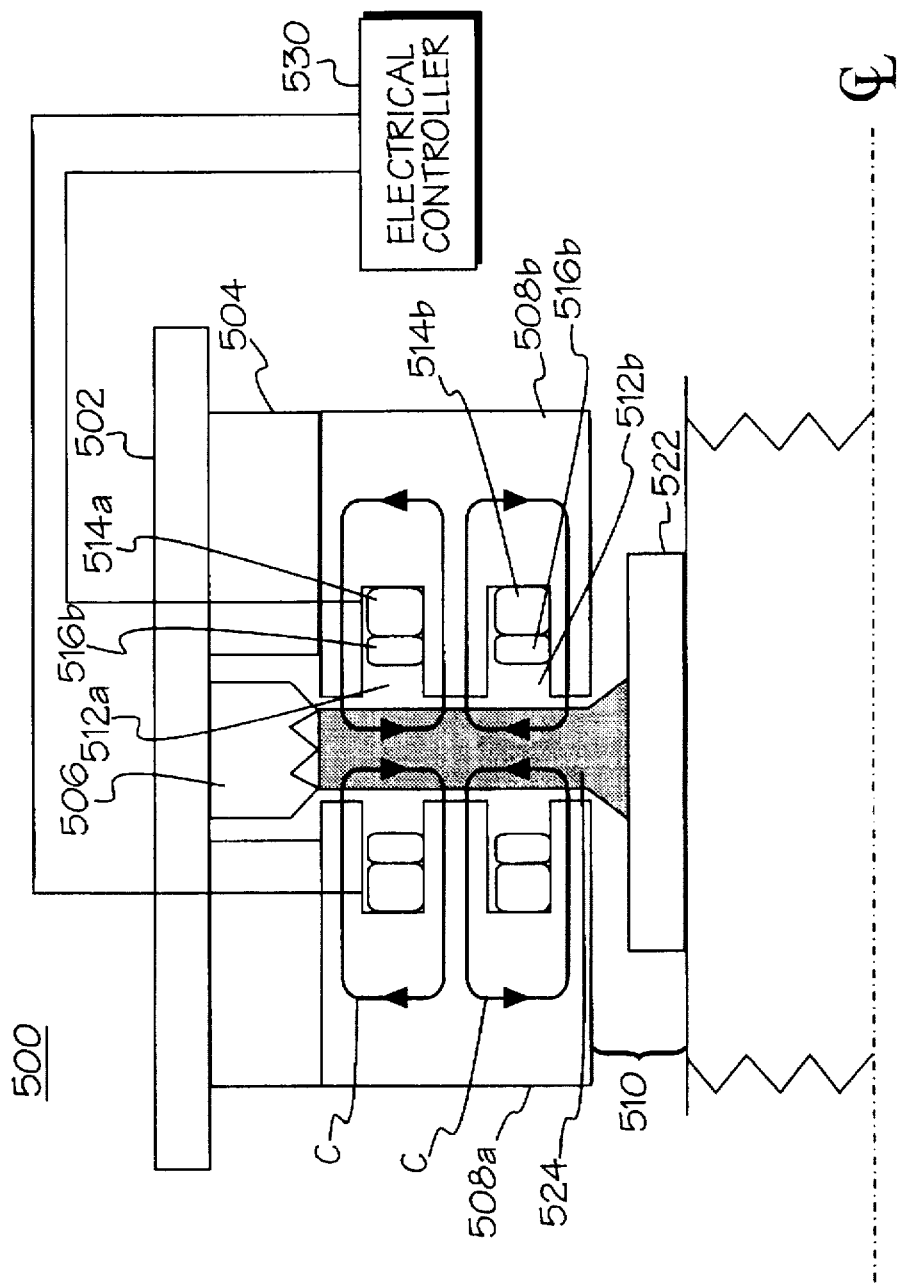
FIG. 7 is partial sectional elevational view of one embodiment of a positioner constructed according to the principles of the present invention.

FIG. 7 illustrates an improvement of an active magnetic seal 500 of the type mentioned in U.S. Pat. No. 5,064,205 to Robert P. Whitford. Magnetic seal 500 is constructed with a cylindrical casing 502 supporting a pair of axially spaced-apart annular spaces 504 and an annular labyrinth seal 506 fitted to extend completely around a portion of the inner circumferential surface of casing 502. A pair of stator stacks 508a, 508b each extends annularly around the interior circumference of corresponding ones of spacers 504. Stator stacks 508a, 508b define a circular interior bore exhibiting an axis B defining the centerline ₵ extending through seal 500. A pair of circumferentially extending slots 512a, 512b are formed within E-shaped stator stacks 508a, 508b, to receive continuously wound, circular bias coils 514a, 514b, and continuously wound circular control coils 516a, 516b.

Central bore 510 accommodates a rotating shaft 520 supporting an annular rotor 522 that, in turn, bears a circular thrust runner 524 extending radially outwardly from axis B to position its distal end to engage labyrinth seal 506. Opposite circumferential surfaces of thrust runner 524 face, but are spaced-apart from the axially extending projections formed by the oppositely directed, E-shaped stator stacks 508a, 508b.

Control coils positioned on axially opposite sides of thrust runner 524 are connected in series to a bi-directional current amplifier contained within the electrical controller 530. The bias coils are connected in series to a separate, low power source included within electrical controller 530. Flux path C created by current flow into the bias coils travels axially through the innermost, central and circumferentially outermost projections of each of the circumferential stator stacks, and travels radially through thrust runner 524 and the axially outer portions of the stator stacks, as shown in FIG. 7.

The configuration of magnetic seal 500 may be used to precisely control the gap between thrust runner 524 and the adjacent axially extending projections of stator stacks 508a, 508b, thereby sealing the connecting volumes within a passage defined by the interior hollow of casing 502, with particular application in turbines, compressors, pumps and other types of rotating equipment. As described in the following paragraphs, this configuration advantageously eliminates a need for positions sensors to complete the loop of the servo-positioner.

In the following description of the various circuits for controlling the disposition of a shaft supported by the electromagnets of the eariler described magnetic actuators, diametrically opposite portinos such as radial arms or arcuate sectors of stators 208a–208c, 304a, 304b, 404a–404c, 404c, 508a, 508b and their cooperating control coils are shown as abstract electrical representations of the stators $S_1$, $S_2$ and coils $L_1$, $L_2$ forming the elctromagnets.

Configuration for Bearing With Complementary Electromagnets

It may be noted that the embodiments of actuators shown in FIGS. 1 through 8 are fully and acurately operable without the use and time delay attributable to shaft position sensors, those embodiments might be readily modified to incorporate shaft position sensors; as was noted earlier herein, sensor-less shaft position detection is believed to provide a more compact actuator design enhanced accuracy of control.

Figure 8:
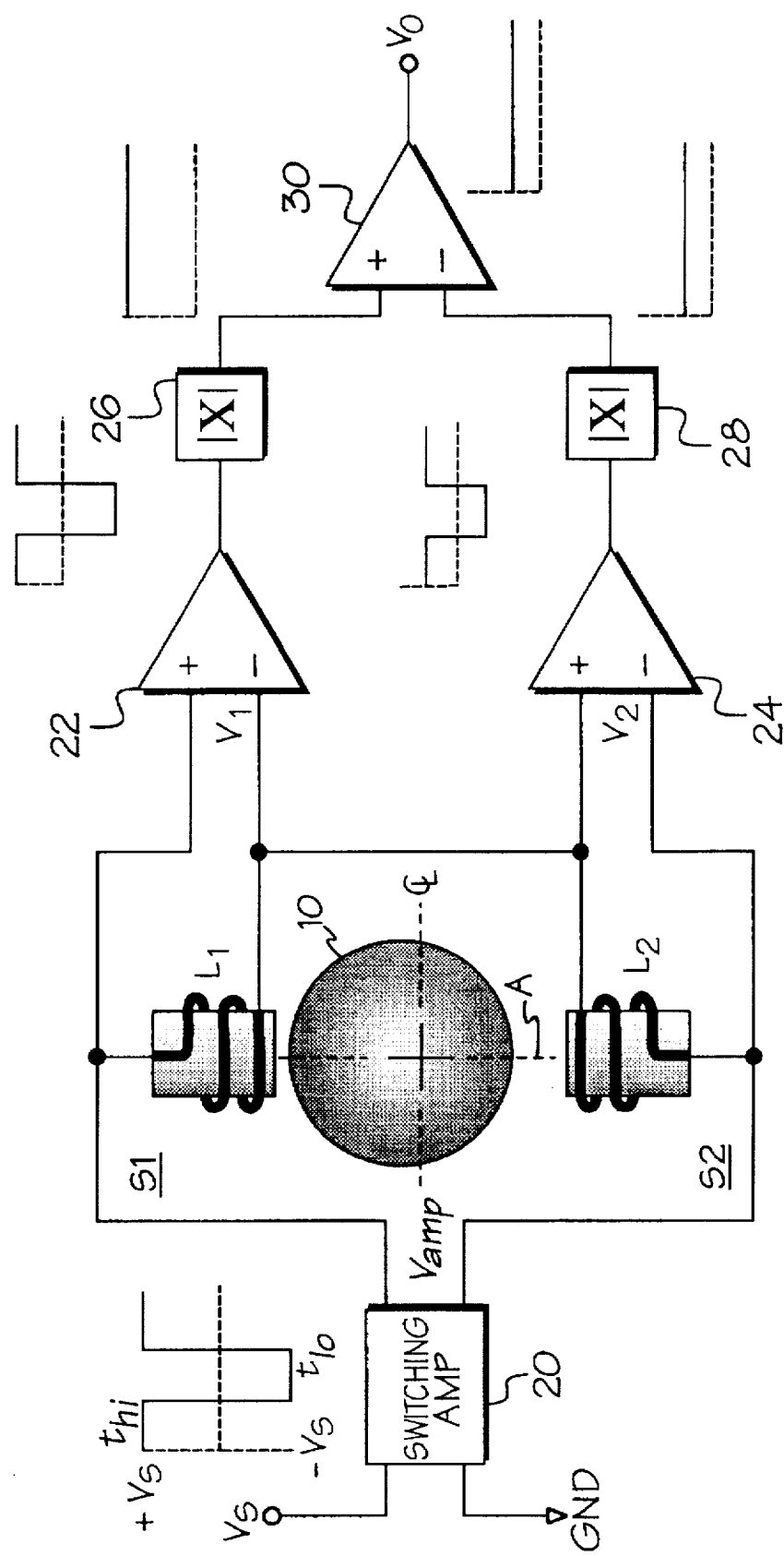
FIG. 8 is a block diagram illustrating implementation of one embodiment of the present invention constructed with complementing coils providing sensorless detection of the position of a shaft position.

Turning now to FIG. 8, one scheme for implementing sensor-less detection for a magnetic bearing configuration is shown in a circuit in which "bias flux" is provided from electromagnets or permanent magnets (not shown) separate from positioning magnets created by circularly wound control coils $L_1$, $L_2$. The structure and circuit for producing bias flux is not shown. The electromagnets formed by stators $S_1$, $S_2$, their cooperating control coils $L_1$, $L_1$ and their corresponding ferromagnetic cores formed by either the stator bass or the radial arms described in the foregoing paragraphs, are co-incident along a coaxial axis A on radially extending through a mass of a ferromagnetic material such as a steel shaft 10, impart forces in opposite directions across this axis. The stators $S_1$, $S_2$ of these electromagnets have control coils $L_1$, $L_2$ electrically connected in series across the outlet ports of switching amplifier 20. As such, the single amplifier 20 supplies the current to control coils $L_1$, $L_2$ of both cooperating portions of stators $S_1$, $S_2$. The opposing coils of $L_1$, $L_2$ of the cooperating portions of the stators $S_1$, $S_2$ driven by a bi-directional (i.e., forward and reverse) current provided through the output ports of switching amplifier 20. The control coils cooperating with stator portions $S_1$, $S_2$ of the electromagnets are connected such that for a given current direction, the currents through the control coil windings induce a magnetic field which adds to the bias flux in one electromagnet and subtracts from the magnetic field in the diametrically opposite electromagnet. In this way, only a single amplifier is needed to impart forces in both directions along axis 4. The non-inverting input port (+) of operational amplifier 22 is coupled with one side of the coil $L_1$ to one of the two output ports of amplifier 20, while the inverting port (−) of operational amplifier 22 is coupled to the node formed between the serial coupled coils $L_1$, $L_2$. The non-inverting port (+) of operational amplifier 24 is coupled to the node formed between the serial coupled coils $L_1$, $L_2$, while the inverting port (−) of operational amplifier 24 is coupled with one lead of the coil $L_2$ to the second output port of amplifier 20. The output voltage from operational amplifiers 22, 24 are respectively separately rectified by absolute value stages 26, 28, and respectively applied to the non-inverting port (+) and inverting port (−) of operational amplifier 30. In turn, operational amplifier 30 provides an output voltage $V_o$ varying with the absolute values provided by rectifiers 26, 28. With this configuration, the electromagnets may be used to control the force on the shaft as well as to detect the position of shaft 10. This circuit eliminates the need for either discrete or separate position sensors.

The operation may be explained as follows. The inductance of the coils will vary with shaft displacements because the inductance of each coil increases with decreasing air gap. As can be seen in FIG. 1, the coils are connected in series, their currents are equal, and their instantaneous voltage drops ($V_1$ and $V_2$) add to the output voltage of the amplifier $V_{amp}$.

In a particular type of switching amplifier, the output voltage $V_{amp}$ is toggled between the supply voltage $+V_s$ and its inverse $-V_s$ with a switching frequency $f_{sw}=(1+t_{sw})$, where $t_{sw}$ is the period of a switching cycle. Within a cycle, the amplifier's output is $V_s$ for a time $t_{hi}$ and is $-V_s$ for a time $t_{lo}$, where $t_{sw}=t_{hi}+t_{lo}$. By varying $t_{hi}$ (and therefore $t_{lo}$), the effective (cycle-averaged) output voltage $V_{\it eff}$ may be varied between $-V_s$ and $+V_s$. The relationship between $t_{hi}$ and $V_{\it eff}$ is:

$$V_{\it eff}=(2t_{hi}/t_{sw}-1) \cdot V_s; \qquad (1)$$

with $0 \leq t_{hi} \leq t_{sw}$, where the ratio $t_{hi}/t_{sw}$ is known as the duty factor DF. In this mode, the effective (cycle-averaged) voltage can be varied continuously between $-V_s$ and $+V_s$ by varying the duty factor between 0 and 100%. For example, a duty factor of 50% corresponds to a cycle-averaged voltage of zero.

Figure 9:
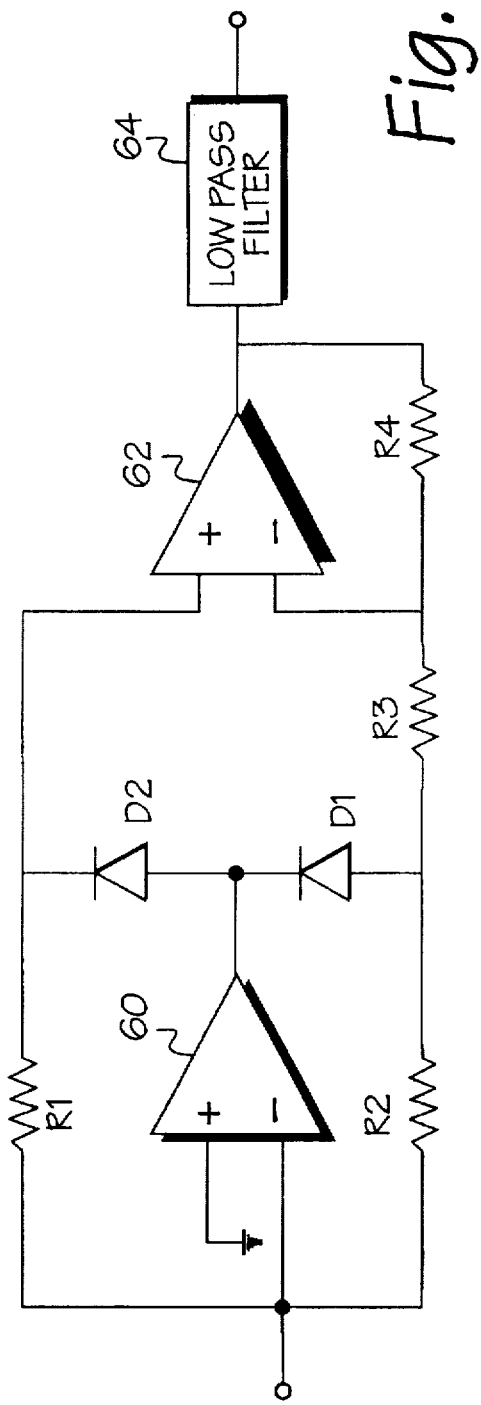
FIG. 9 is a schematic diagram illustrating an absolute value circuit suitable for use in the circuit of FIG. 8.

A representation of the inductance of each coil $L_1$, $L_2$ (which is a function of the air gap of the coil) can be determined by measuring the voltage drops across the coils. A differential amplifier first isolates the voltage waveform across each coil. The output of the differential amplifier will resemble a square wave with an amplitude that varies with the air gap. The square waves are then applied to an absolute value circuit that provides an output that will be approximately a direct current signal. One embodiment of the absolute value circuit using high-gain amplifiers such as operational amplifiers 60, 62 is shown in FIG. 9. The direct current signals from the two control coils $L_1$, $L_2$ are then subtracted to determine the position of shaft 18. In this circuit, the inverting port (−) of each operational amplifier 60 are coupled to receive the output signal from the corresponding output port of operational amplifiers 22, 24 while the non-inverting input ports are coupled to a reference potential such as a local ground. Resistor R1 is coupled between the output terminal of operational amplifier 22 and the non-inverting port (+) of operational amplifier 62 while resistors R2, R3, R4 are serially coupled between the output terminal of operational amplifier 22 and the output terminal of operational amplifier 62, with the node between resistors R3, R4 coupled to the inverting port (−) of operational amplifier 62. Diodes D1, D2 are serially coupled between the node between resistors R2, R3 and the node between resistor R1 and the non-inverting port (+) of operational amplifier 62, with the node between diodes D1, D2 coupled to the output port of operational amplifier 60. The output port of operational amplifier 62 is coupled to the input port of low pass filter 64.

13

Ignoring resistive voltage drops, the output voltage $V_o$ is related to the coil inductances of electromagnets $L_1$, $L_2$ by the formula:

$$V_0=(L_1-L_2) \cdot V_s/(L_1+L_2),\quad (2)$$

where $L_1$ is the inductance of the one coil and $L_2$ is the inductance of its coaxially aligned, complementary coil. Over a range of displacements, the inductance will follow an inverse gap relationship and the sum of $L_1$ and $L_2$ will be approximately constant. Equation 2 can then be approximated by:

$$V_0=(x/g)V_s \quad (3)$$

which indicates that the output will be fairly linear with displacement of shaft 18.

It is desirable to eliminate the effect of variations in the supply voltage $V_s$ on the output of the circuit because the supply voltage may vary depending on its availability and whether it is electrically regulated. Elimination of the effect of variation in the supply of voltage $V_s$ may be accomplished by normalizing the output as $V_o/V_s$. The division operation can be performed by taking the logarithm of the two signals, subtracting, and then performing an anti-log operation. Alternatively, the division can be performed using a multiplier electrical component in conjunction with a high-gain amplifier as is shown in FIG. 10.

Figure 10:
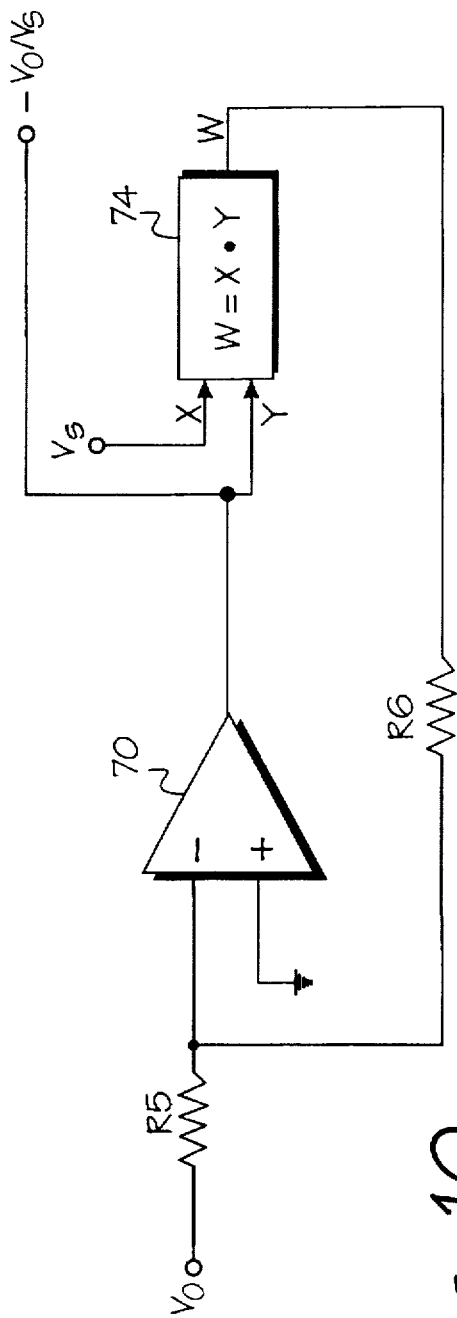
FIG. 10 is a schematic diagram illustrating a circuit for eliminating dependence of the output voltage upon the supply voltage.
Figure 11:
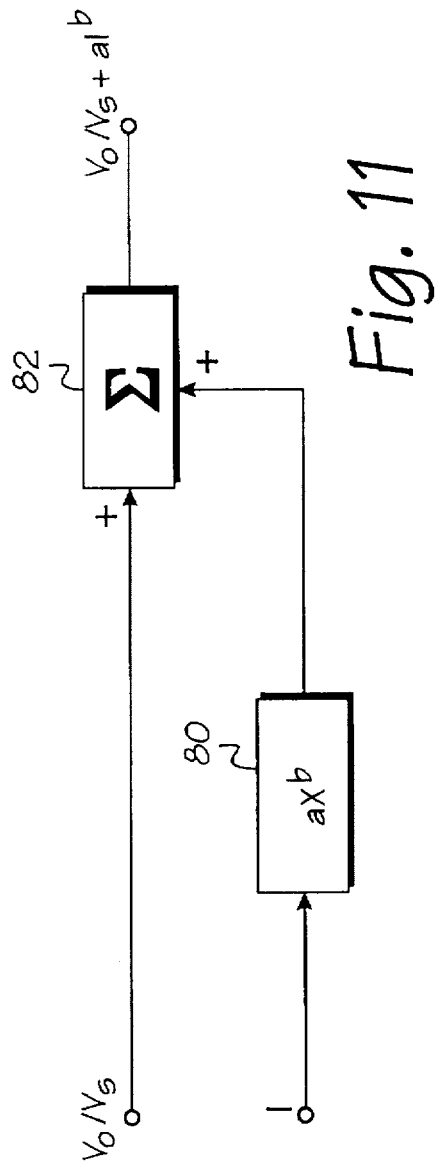
FIG. 11 is a schematic diagram illustrating a circuit for correcting for the effects of magnetic saturation.

In the circuit of FIG. 10, the output voltage $V_o$ from operational amplifier 30 is applied across resistor R5 to the inverting port (−) of operational amplifier 70; the non-inverting port (+) of operational amplifier 70 is coupled to a reference potential use as a local ground. The output port from operational amplifier 70 is applied to the Y input port of a multiplier 72, while a supply voltage $V_s$ is applied to the X import port of multiplier 72. An output potential W=X·Y is applied across resistor R6 to the inverting port (−) of operational amplifier 70. The output signal provided from the output port of operational amplifier 70 is proportional to −($V_o/V_s$); by applying this output signal to an additional operational amplifier, the output signal will be re-inverted. By eliminating output voltage dependence upon variations of the supply voltage $V_s$ applied to switching amplifier 20, this approach reduces the complexity of the divider circuit and increases its linearity. With these circuit elements, the output voltage will simply be (x/g) and will be independent of the supply voltage.

Equation 3 can be modified to include finite permeability (including saturation) effects of the actuator's iron stators. In one simple implementation shown in FIG. 11, a correction term "X" proportional to the electromagnet current raised to the power b is added to "Z", the normalized position signal $V_o/V_s$, to compensate for the reduced inductance caused by saturation effects at high current levels. This lends itself to either analog or digital implementations. In the circuit shown, the inverted output signal $V_o/V_s$ from the circuit of FIG. 10, is applied to an adder 82. The control current I is raised by stage 80 to a power b and multiplied by a coefficient a, and the output $aI^b$ is added by adder 82, to the value $V_o/V_s$. Effectively, this stage corrects for the effects of magnetic saturation.

In another scheme, the normalized position signal obtained from the voltage $V_o/V_s$ is digitized and the correction term to x/g is found from a look-up table or other calculation which relates x to $V_o/V_s$ and I, where I is the control current.

14

Configuration for Independently Controlled Electromagnets

Figure 12:
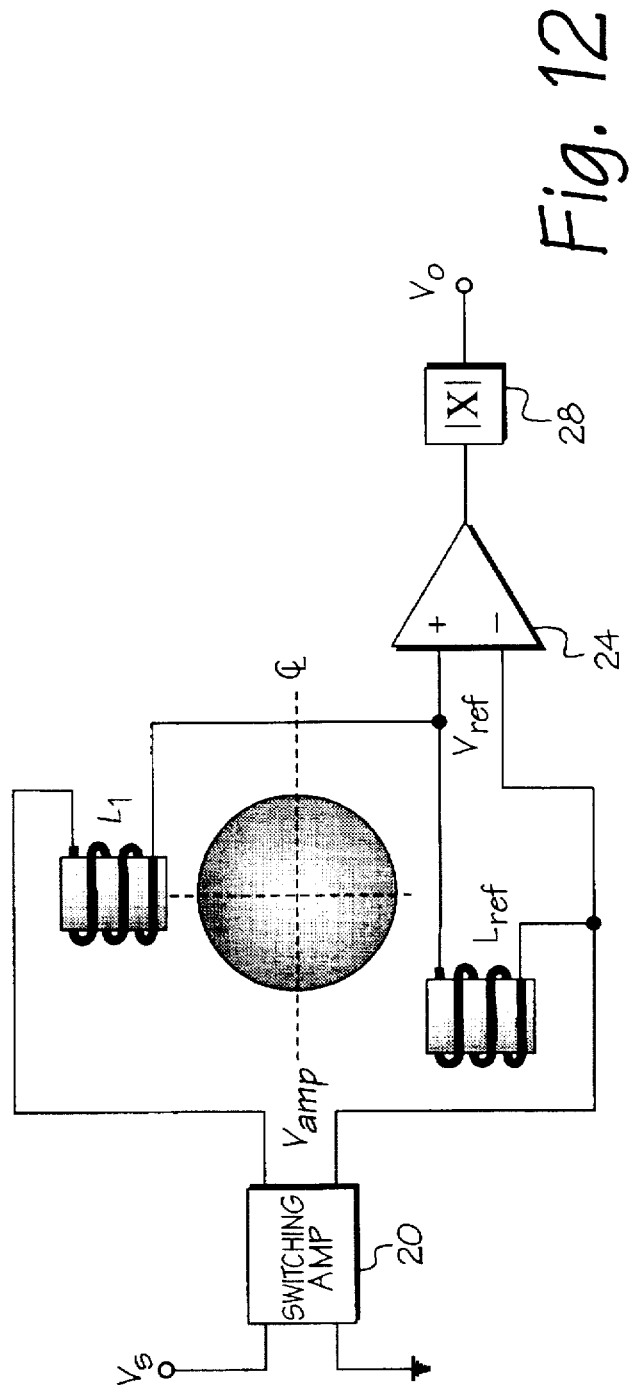
FIG. 12 is a block diagram illustrating implementation of an alternative embodiment constructed according to the principles of the present invention with one positioning coil.

The principles of the present invention can be extended to configurations in which one or more electromagnets are independently controlled, i.e., are not connected electrically in series. For this case, a reference inductance $L_{ref}$ is placed in series with the one control coil $L_1$ of the electromagnet. In one embodiment, the inductance is about ten percent (10%) of the inductance of the electromagnet. This allows for a high signal-to-noise ratio (since $V_s$ is substantial) without significantly degrading the slew-rate of the electromagnet due to the inductance of the reference coil. The conceptual design for this approach is shown in FIG. 12. In this case, the output voltage is given by Equation (4):

$$V_0=V_s \cdot L_{ref}/(L_1+L_{ref})=V_s \cdot L_{ref}/L_1 \quad (4)$$

In this configuration, the output voltage will be less linear than in an embodiment with complementing electromagnets coupled in series because the non-linearity of the electromagnet's inductance as a function of its air gap is not cancelled by that of a complementary electromagnet.

Figure 13:
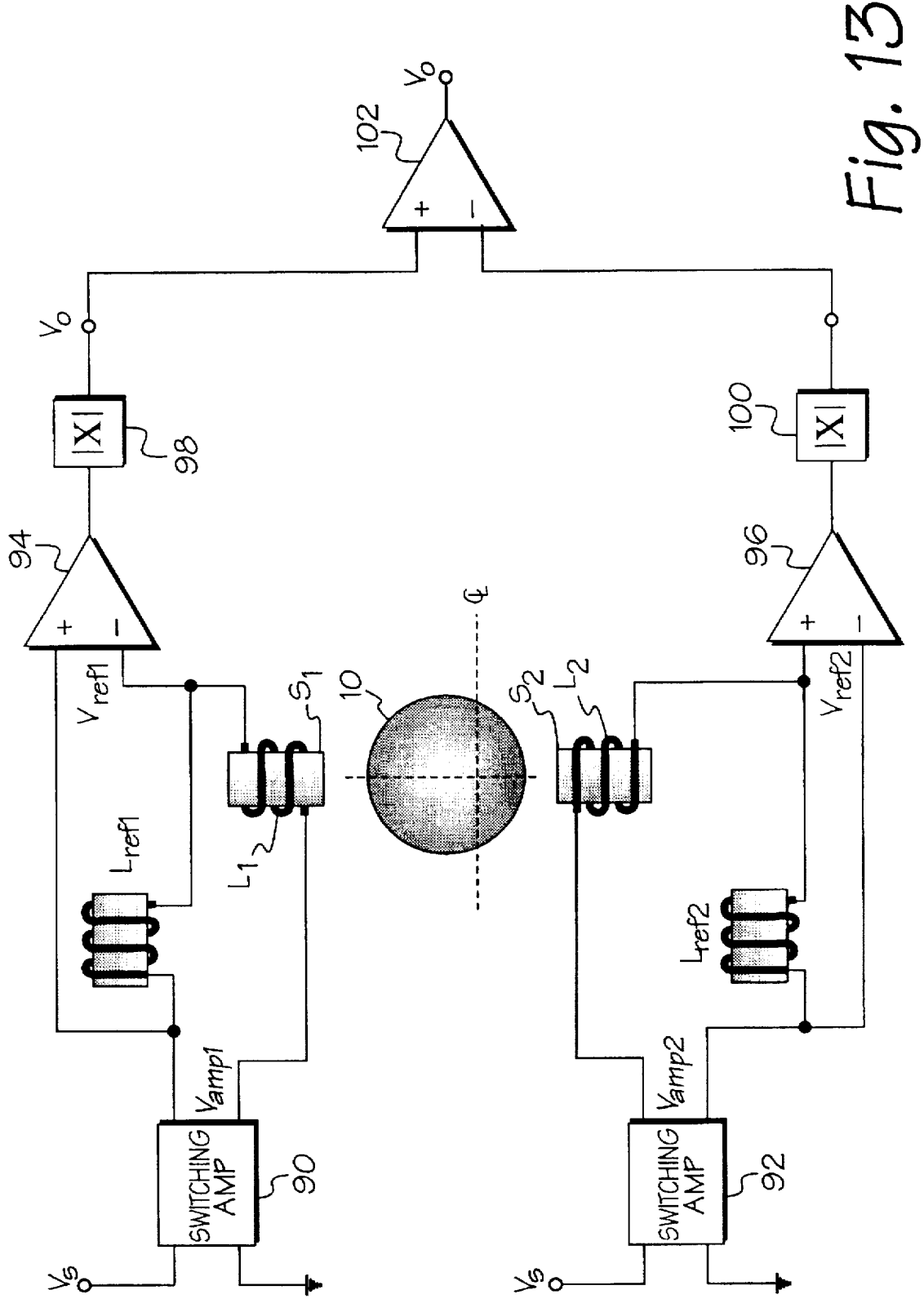
FIG. 13 is a block diagram illustrating implementation of another embodiment constructed according to the principles of the present invention using a bi-directional actuator with independently controlled electro magnets.

Turning now to FIG. 13, the linearity can be significantly improved for the case of bi-directional actuators with separately controlled, coaxially aligned and diametrically opposed stators $S_1$, $S_2$ of an electromagnet however, by implementing the identical scheme for the opposing coil by employing another reference coil, and subtracting the resulting outputs voltages i. The linearity in this configuration is about the same as for complementing electromagnets connected electrically in series as shown in FIG. 8.

Figure 14:
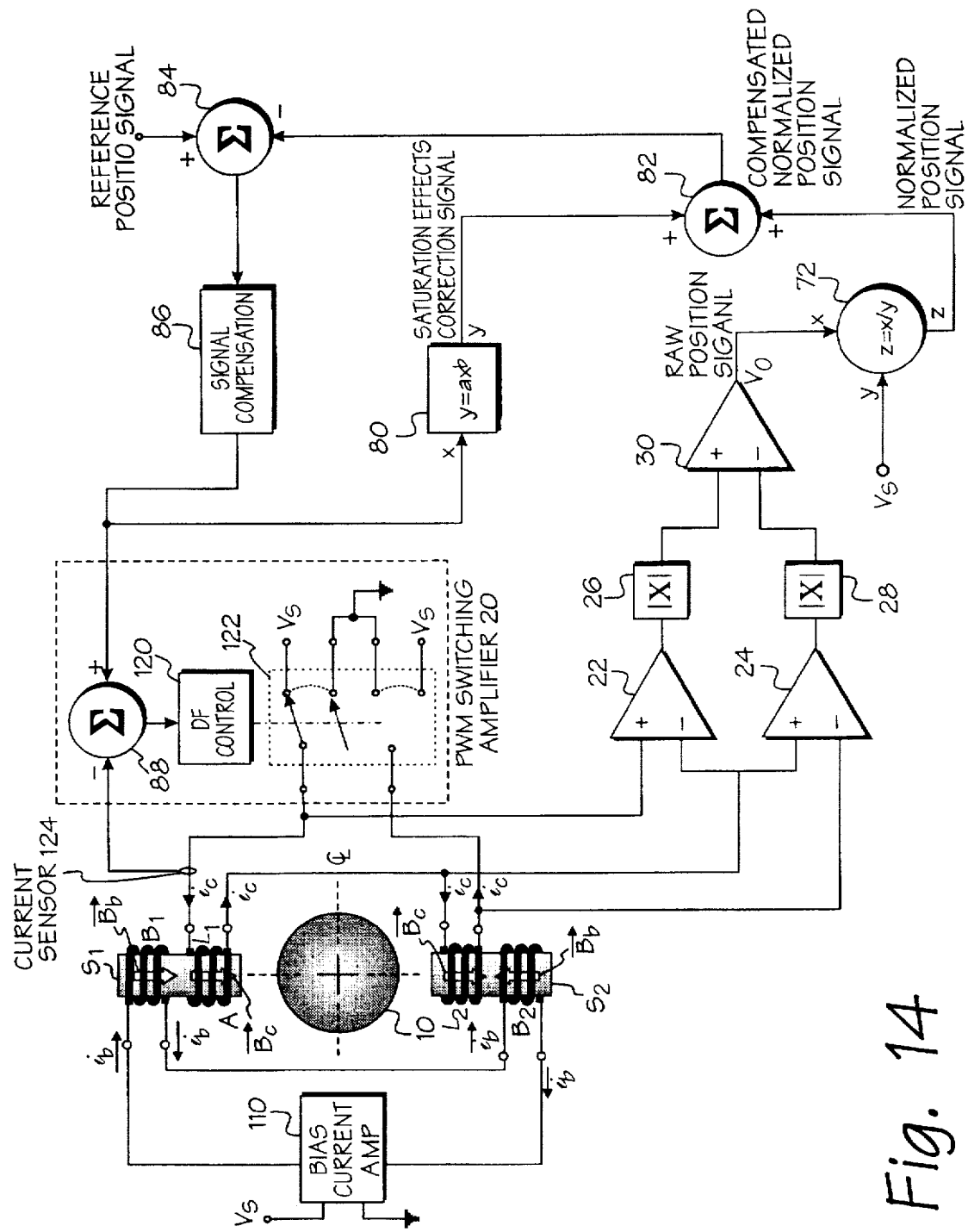
FIG. 14 is a schematic diagram of the bias circuit and the control circuit as applied to an embodiment constructed according to the principles of the present invention, showing one operational mode.
Figure 15:
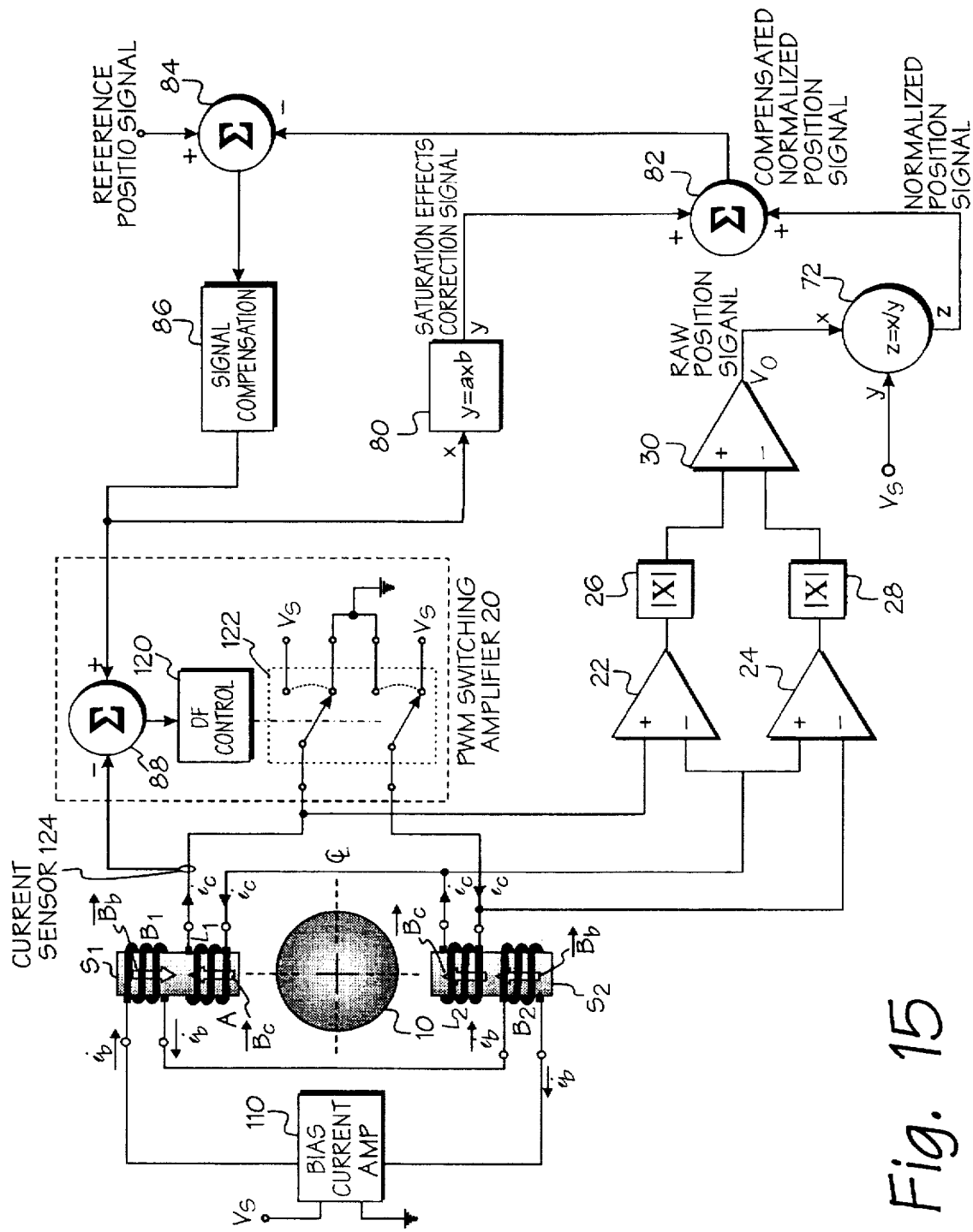
FIG. 15 is a schematic diagram showing the circuit illustrated in FIG. 14, in another operational mode.

FIGS. 14 and 15 show a bias current amplifier 110 providing a bias current through serially coupled bias coil windings $B_1$, $B_2$ and control coils $L_1$, $L_2$ respectively wound around stators $S_1$, $S_2$. Control coils $L_1$, $L_2$, bias coils $B_1$, $B_2$, and stators $S_1$, $S_2$ are coaxially aligned on diametrically opposite sides of the centerline $\mathcal{C}$ of shaft 10. Bias current amplifier 110 provides a relatively constant bias current $i_b$ through each diametrically opposite pair of series opposingly wound, and serially coupled bias coils $B_1$, $B_2$, with each bias coil creating a bias component $B_b$ of the flux field. With the switched modes established by duty factor controller 120 for the switch stage 122 of pulse width modulated switching amplifier 20 shown in FIGS. 14 and 15, a control current $i_c$ is applied to flow through each diametrically opposite and series aiding wound, and serially coupled pair of control coils $L_1$, $L_2$, with each of the control coils creating a control component $B_c$ of the flux field. At the particular point of the duty cycle of the circuit shown in FIG. 14, the field, $B_{top}$ created by the upper bias and control coils $B_1$ and $L_1$ is described by Equation (5) as:

$$B_{top}=B_b+B_c \quad (5)$$

while the field, $B_{bottom}$ created by the lower bias and control coils $B_2$ and $L_2$ is described by Equation (6) as:

$$B_{bottom}=B_b-B_c \quad (6)$$

The net force, $F_{net}$ applied by the diametrically opposite portions of the actuator is described by Equation (7) as:

$$F_{net}=[(B_b+B_c)^2-(B_b-B_c)^2]=4B_cB_b \quad (7)$$

At the subsequent particular point of the duty cycle of the circuit shown in FIG. 15, with a reversal of the direction of control current $i_c$ flow through the control coils, the field, $B_{top}$ created by the upper bias and control coils $B_1$ and $L_1$ is described by Equation (8) as:

$$B_{top} = B_b - B_c \qquad (8)$$

while the field, $B_{bottom}$ created by the lower bias and control coils $B_2$ and $L_2$ is described by Equation (9) as:

$$B_{bottom} = B_b + B_c \qquad (9)$$

The non-inverting input port of operational amplifier 22 is coupled to receive the instantaneous control current $i_c$ applied by switching stage 122 to control coil $L_1$ while the inverting port of operational amplifier 22 and the non-inverting port of operational amplifier 24 receive the instantaneous control current $i_c$ at the node between serially coupled control coils $L_1$ and $L_2$. The inverting port of operational amplifier 24 receives the instantaneous control current $i_c$ between the other end of control coil $L_2$ and switching stage 122 (i.e., the local reference, or ground, potential in the mode shown in FIG. 14, and $V_s$ in FIG. 15). Rectifier stages 26, 28 are respectively coupled between the outport ports of operational amplifiers 22, 24 and the non-inverting and inverting ports of operational amplifier 30, to provide absolute values from those outport ports to operational amplifier 30. Operational amplifier 30 provides at its output port an output voltage $V_o$ that serves as a raw position signal x indicative of the raw position of shaft 10 relative to the portion of the actuator that includes control coils $L_1$, $L_2$.

The output voltage $V_o$ provided by operational amplifier 30 is representative of the raw position of shaft 10 relative to control coils $L_1$, $L_2$ and is provided as the x input to divider 72: the supply voltage $V_s$ is applied to the y input port of divider 72. The value z, measured at the output port of divider 72 provides a signal indicative of the position of shaft 10 relative to the diametrically opposed control coils $L_1$, $L_2$.

$$V_z = V_o / V_s \qquad (10)$$

In effect, the z component at the output port of divider 72 is a normalized voltage $V_z$, that serves to indicate the normalized position of shaft 10 relative to electromagnets $S_1$, $S_2$. The normalized position signal is applied to one input port (+) of adder 82. The control current command I is applied to the x port of stage 80 to provide the signal $aI^b$ corrected for effects of magnetic saturation to the second input port (+) of adder 82. Adder 82 provides an output signal compensated for effects of magnetic saturation and normalized relative to the supply voltage $V_s$, that is applied to the subtraction port (−) of adder 84 to be subtracted by adder 84 from a reference position signal set to a value representative of a reference position that is applied to one input port of a second adder 84; the resulting difference signal provided by adder 84 is indicative of the position correction. This position correction is subjected to signal conditioning by stage 86 to generate the current command signal applied to the (+) port of adder 88. Current sensor 124 is wrapped around the lead between switching stage 122 and one end terminal of the upper control coil $L_1$, to sense the instantaneous control current $i_c$, is coupled to the (−) port of adder 88. Adder 88 continuously applies a control signal responsive to the sensed signal derived by current sensor 124 from the control current $i_c$ and the raw position signal provided by operational amplifier 30, to responsively vary the duty cycle set by controller 120, and thus control operation of switching stage 122.

Switching amplifier 20, represented in abstract detail in FIGS. 14 and 15, uses adder 88 to subtract an instantaneous sensed current derived by current sensor 124 from the control current $i_c$ flowing through the windings of the serially coupled control coils $L_1$, $L_2$ of electromagnets $S_1$, $S_2$, from the current command signal provided by signal conditioning stage 86, in order to thereby generate a duty factor control signal applied to duty factor controller 120 to vary the duty factor of the pulse width modulation provided by pulse width modulation switching amplifier 20. Amplifier 20 toggles between application of opposite polarities of the supply voltage $V_s$ across the control coils based upon the current duty factor, thereby continually endeavoring to return the centerline of shaft 10 to a position equidistant between the closest poles of stators $S_1$, $S_2$ (assuming that the reference position signal applied to the addition (+) port of adder 84 is set to indicate an equidistant spacing).

It should be understood that for a typical application of the foregoing principles, a plurality of circuits such as, for example, that represented FIG. 14, are employed and are in simultaneous operation. Moreover, regardless of whether shaft 10 is rotating or subjected to axially reciprocation, the current through the positioning coils of the electromagnets positioned about shaft 10 is controlled to continually compensate for changes in the position of shaft 10 as, for example, due to loads applied irregularly to shaft 10 during operation. Moreover, the particular configurations of the actuators shown in FIGS. 1 through 7 may be varied to conform to a particular application. The embodiment shown in FIG. 4 for example, might also be constructed with more than two stator stacks. There is considerable flexibility on the placement of the coils in the designs of these actuators. The bias coils could be placed on the poles of the center stack and the control coils on the poles of the end stacks. Or, alternatively, the bias coils may be placed between the stacks, as shown in FIG. 2. In this case, the axis of the bias is concentric with the bore of the stator laminations. This configuration of the bias coils is also possible in FIG. 4, and in fact probably preferred for this embodiment.

The several foregoing embodiments have tended to show stators, laminated stator stacks and stator disks providing an even number of magnetic poles. The devices illustrated however, in keeping with the concept of a homopolar device, may be also constructed with stators having an odd number of magnetic poles. With such structures, the control circuit of FIG. 12 or a variation of the control circuit shown in FIG. 13 (using an operational amplifier stage accommodating an odd number of input position signals) may be used.

Although radial magnetic bearing configurations were used to illustrate the operation of the sensor-less detection circuitry, the foregoing principles may be practiced in alternative configurations for thrust bearings and other magnetic positioner. In an embodiment of a thrust bearing, the electromagnets would impart a force on the face of a disk mounted on a shaft so that an axial force is effected. The electromagnets may also impart a force, for example on a diaphragm for the case of a diaphragm compressor or expander, on a piston, on a sealing face, or on a rod for a vibration isolator. For each of these applications, the member may be actively positioned using the position signal obtained form the circuits described herein.

What is claimed is:

1. An electromagnetic bearing, comprising:
    a pair of spaced-apart circular coils coaxially disposed around a longitudinal axis, to define a bore centered upon said longitudinal axis;
    a first plurality of arcuately spaced-apart control coils each subtending different spaced-apart arcs centered upon said longitudinal axis, said first plurality of control coils being radially aligned with and spaced-apart from a first one of said circular coils; and a second plurality of arcuately spaced-apart control coils each subtending different spaced-apart arcs centered upon said longitudinal axis, said second plurality of control coils being axially separated from said first plurality of control coils while being radially aligned with and spaced-apart from a second one of said circular coils.

2. The electromagnetic bearing of claim 1, further comprising:

a first laminated stator disk coaxially disposed around said longitudinal axis positioned between and separating said pair of circular coils, and positioned between and separating said first plurality of control coils from said second plurality of control coils, and cooperating with said circular coils, said first plurality of control coils, and said second plurality of control coils.

3. The electromagnetic bearing of claim 2, further comprised of:

a plurality of cores each defining a secondary axis parallel to and radially separated from, said longitudinal axis;

each of said first plurality of control coils being wound around a different corresponding one of said cores; and said plurality of cores electromagnetically coupling corresponding ones of said first plurality of control coils to said stator disk.

4. The electromagnetic bearing of claim 2, comprising:

a first plurality of laminated cores each defining a secondary axis parallel to and radially separated from said longitudinal axis;

a second plurality of laminated cores each defining a tertiary axis parallel to and radially separated from said longitudinal axis;

each of said first plurality of control coils being wound around a different corresponding one of said first laminated cores;

each of said second plurality of control coils being wound around a different corresponding one of said second laminated cores;

said first and second pluralities of laminated cores coupling corresponding ones of said first and second pluralities of control coils to said stator disk; and said stator disk spatially separating said first plurality of laminated cores from said second plurality of laminated cores.

5. The electromagnetic bearing of claim 2, further comprised of said stator disk being perforated by a multiplicity of open elongated slots equal in number to said second plurality, said stator disk having an inner circumference disposed adjacent to said bore and an outer circumference, each of said slots extending radially from corresponding locations spaced-apart from said inner circumference and radially toward said outer circumference.

6. The electromagnetic bearing of claim 2, further comprised of said stator disk being perforated by a multiplicity of open elongated slots equal in number to said second plurality, said stator disk having an inner circumference disposed adjacent to said bore and an outer circumference, each of said slots extending radially from corresponding locations spaced-apart from said inner circumference and radially toward said outer circumference, each of said slots being positioned between different neighboring pairs of said second plurality of coils.

7. The electromagnetic bearing of claim 2, further comprised of means for dividing said stator disk into a multiplicity of sectors equal in number to said second plurality, and for magnetically isolating each of said sectors.

8. The electromagnetic bearing of claim 1, further comprising:

a first stator disk coaxially disposed around said longitudinal axis, positioned between and separating said first one of said circular coils from said second one of said circular coils, said first stator disk positioned between and separating said first plurality of control coils from said second plurality of control coils, and cooperating with said circular coils, said first plurality of control coils, and said second plurality of control coils;

a second stator disk coaxially disposed around said longitudinal axis, spaced-apart by said first one of said circular coils from said first stator disk, and cooperating with said first one of said circular coils; and a third stator disk coaxially disposed around said longitudinal axis, spaced-apart by said second of said circular coils from said first stator disk, and cooperating with said second one of said circular coils.

9. The electromagnetic bearing of claim 8, further comprised of:

a first plurality of laminated cores disposed to form flux couplings between said first stator disk and said second stator disk, each of said first plurality of laminated cores defining a secondary axis parallel to and radially separated from said longitudinal axis;

a second plurality of laminated cores disposed to form flux couplings between said first stator disk and said third stator disk, each of said second plurality of laminated cores defining a tertiary axis parallel to and radially separated from said longitudinal axis;

each of said first plurality of control coils being wound around a different corresponding one of said first laminated cores;

each of said first plurality of control coils being wound around a different corresponding one of said second laminated cores;

said first and second pluralities of laminated cores coupling corresponding ones of said first and second pluralities of control coils to said stator disk; and said stator disk spatially separating said first plurality of laminated cores from said second plurality of laminated cores.

10. The electromagnetic bearing of claim 1, further comprised of a plurality of laminated cores each defining a secondary axis parallel to but radially separated from, said longitudinal axis, each of said first plurality of control coils and each of said second plurality of control coils being wound around a different corresponding one of said cores.

11. The electromagnetic bearing of claim 1, comprising:

said first plurality of control coils each defining axes parallel to said longitudinal axis; and said second plurality of control coils each defining axes parallel to said longitudinal axis.

12. The electromagnetic bearing of claim 1, comprising:

a first stator disk coaxially disposed around said longitudinal axis, positioned between and axially separating said pair of circular coils, said first stator disk having a continuous circular interior circumferential surface.

13. The electromagnetic of claim 1, comprising:

a first stator disk coaxially disposed around said longitudinal axis, positioned between and axially separating said pair of circular coils, said first stator disk having a continuous circular exterior circumferential surface and a continuous circular interior circumferential surface.

14. The electromagnetic of claim 1, comprising:
a first stator disk coaxially disposed around said longitudinal axis, positioned between and axially separating said pair of circular coils;
a second stator disk coaxially disposed around said longitudinal axis and spaced-apart by said first one of said circular coils from said first stator disk;
said first stator disk having a continuous circular interior circumferential surface defining said bore; and
said second stator disk having a continuous circular interior circumferential surface surrounding said bore.

15. The electromagnetic of claim 1, comprising:
a first stator disk coaxially disposed around said longitudinal axis, positioned between, electromagnetically cooperating with and axially separating said pair of circular coils;
a second stator disk coaxially disposed around said longitudinal axis, electromagnetically cooperating with and spaced-apart by said first one of said circular coils from said first stator disk;
said first stator disk having a continuous circular interior circumferential surface defining a first plurality of electromagnetic poles all exhibiting a first magnetic polarity; and
said second stator disk having a continuous circular interior circumferential surface surrounding said bore and defining a second plurality of electromagnetic poles all exhibiting a second and opposite magnetic polarity.

16. The bearing of claim 1, comprising:
a first stator disk coaxially disposed around said longitudinal axis in cooperation with said circular coils, said first plurality of control coils, and said second plurality of control coils, positioned between and separating said pair of circular coils, and positioned between and separating said first plurality of control coils from said second plurality of control coils; and
said first stator disk forming a plurality of poles disposed in a homopolar array around said bore.

17. The bearing of claim 16, comprising:
diametrically opposite pairs of said first plurality of control coils being electrically coupled in series; and
means for periodically applying a direct current potential across different said diametrically opposite pairs of said first plurality of control coils.

18. The electromagnetic bearing of claim 1, comprising:
sensing means electrically coupled across a first pair of said first plurality of control coils positioned on diametrically opposite sides of said bore, for providing a position signal indicative of a position of a mass of ferromagnetic material disposed with said bore; and
switching means for applying a pulse modulated potential difference across said first pair of said control coils, with a duty cycle of said pulse modulated potential difference varying in dependence upon said position signal.

19. The electromagnetic bearing of claim 1, comprising:
sensing means electrically coupled across a first pair of said first plurality of control coils positioned on diametrically opposite sides of said bore, for providing a position signal indicative of a position of a mass of ferromagnetic material disposed with said bore;
means for generating a control signal by modifying said position signal in dependence upon a reference signal defining an equilibrium location of the mass within said bore; and
switching means for applying a pulse modulated potential difference across said first pair of said control coils, with a duty cycle of opposite polarities of said pulse modulated potential difference varying in dependence upon said control signal.

20. A magnetic bearing, comprising:
a plurality of axially laminated stators of ferromagnetic material positioned axially spaced-apart along a longitudinal axis to define a central bore centered upon said longitudinal axis, each of said plurality of stators providing a plurality of poles symmetrically arrayed around said bore with all of said poles in any one of said stators instantaneously exhibiting a single polarity, said plurality of stators defining a central path for lines of flux through said bore and defining a plurality of radial paths for said lines of flux extending radially outwardly from said bore and through said stators, each of said stators providing magnetic isolation between each of said radial flux paths within corresponding different sectors of each of said stators while coupling said lines of flux extending through said bore with said radial paths;
armature means formed of a ferromagnetic material radially spaced-apart from said bore and extending axially between radially outward portions of said different sectors of neighboring ones of said stators, for providing axial couplings of said lines of flux between said stators by forming a plurality of arcuately separated parallel axial flux paths aligned approximately parallel to said longitudinal axis and to extend between axially aligned pairs of said radial paths through said stators while preserving said magnetic isolation of lines of flux between said different sectors of each of said stators; and
a plurality of circular coils symmetrically arrayed around said bore, to induce said lines of flux to provide axial polarization of said plurality of stators.

21. The bearing of claim 20, comprising:
said plurality of circular coils being coaxially disposed around said longitudinal axis and being axially separated by a central one of said stators.

22. The bearing of claim 20, comprising:
a first plurality of said plurality of circular coils being arcuately spaced-apart to subtend different arcuately spaced-apart arcs centered upon said longitudinal axis;
a second plurality of said plurality of circular coils being arcuately spaced-apart to subtend different arcuately spaced-apart arcs centered upon said longitudinal axis; and
said first plurality of circular coils being axially separated by a central one of said stators from said second plurality of circular coils.

23. The bearing of claim 20, comprising:
said plurality of circular coils being coaxially disposed around said longitudinal axis and being axially separated by a central one of said stators;
a first plurality of control coils being arcuately spaced-apart to subtend different arcuately spaced-apart arcs centered upon said longitudinal axis;
a second plurality of control coils being arcuately spaced-apart to subtend different arcuately spaced-apart arcs centered upon said longitudinal axis; and said first plurality of control coils being axially separated by said central one of said stators from said second plurality of control coils.

24. The bearing of claim 20, comprising:

said plurality of circular coils being coaxially disposed around said longitudinal axis and being axially separated by a central one of said stators;

a first plurality of control coils being arcuately spaced-apart to subtend different arcuately spaced-apart arcs centered upon said longitudinal axis;

a second plurality of control coils being arcuately spaced-apart to subtend different arcuately spaced-apart arcs centered upon said longitudinal axis;

said first plurality of control coils being axially separated by said central one of said stators from said second plurality of control coils; and said armature means comprising a plurality of cores each defining a secondary axis parallel to but radially separated from, said longitudinal axis, each of said first plurality of control coils and each of said second plurality of control coils being wound around a different one of said cores.

25. The bearing of claim 20, comprising:

said armature means comprising a plurality of arcuately spaced-apart cores each defining a secondary axis parallel to and radially separated from, said longitudinal axis;

a first plurality of control coils being wound around different corresponding ones of said cores.

26. The bearing of claim 20, comprising:

said plurality of poles of each of said stators being joined together in a single structure by intermediate webs to form a continuous central circumferential hub perforated by said bore, with each of said poles exhibiting a radial axis extending radially outwardly from said longitudinal axis, and with distal ends of said poles being arcuately spaced-apart and conveying said lines of flux to corresponding ones of said axial flux paths; and said armature means extending between said distal ends of radially aligned said poles of said axially spaced-apart stators.

27. The bearing of claim 20, comprising:

said plurality of poles of each of said stators being joined together in a single structure by intermediate webs to form a continuous central circumferential hub perforated by said bore, with each of said poles exhibiting a radial axis extending radially outwardly from said longitudinal axis, and with distal ends of said poles being arcuately spaced-apart and conveying said lines of flux to corresponding ones of said axial flux paths;

said armature means extending between said distal ends of radially aligned said poles of said axially spaced-apart stators; and each of said plurality of coils being wound around different ones of said poles coaxially with a corresponding said radial axis.

28. The bearing of claim 20, comprising:

each of said stators comprised of a plurality of webs with said plurality of poles of each of said stators being joined together in a single structure by intermediate ones of said webs to form a continuous central circumferential hub perforated by said bore;

diametrically opposite pairs of said poles extending radially outwardly from said longitudinal axis; and distal ends of said poles being arcuately spaced-apart and conveying said lines of flux to corresponding said axial flux paths.

29. The bearing of claim 20, comprising:

each of said stators comprised of a plurality of webs with said plurality of poles of each of said stators being joined together in a single structure by intermediate ones of said webs to form a continuous central circumferential hub perforated by said bore;

diametrically opposite pairs of said poles extending radially outwardly from said longitudinal axis;

distal ends of said poles being arcuately spaced-apart and conveying said lines of flux to corresponding said axial flux paths; and said armature means extending between said distal ends of radially aligned ones of said poles of said axially spaced-apart stators.

30. The bearing of claim 20, comprising:

each of said stators comprised of a plurality of webs with said plurality of poles of each of said stators being joined together in a single structure by intermediate ones of said webs to form a continuous central circumferential hub perforated by said bore;

diametrically opposite pairs of said poles extending radially outwardly from said longitudinal axis;

distal ends of said poles being arcuately spaced-apart and conveying said lines of flux to corresponding said axial flux paths; and said armature means extending between said distal ends of radially aligned ones of said poles of said axially spaced-apart stators.

31. The bearing of claim 20, comprising:

each of said stators comprised of a plurality of webs with said plurality of poles of each of said stators being joined together in a single structure by intermediate ones of said webs to form a continuous central circumferential hub perforated by said bore;

diametrically opposite pairs of said poles extending radially outwardly from said longitudinal axis;

distal ends of said poles being arcuately spaced-apart and conveying said lines of flux to corresponding said axial flux paths; and said armature means extending between said distal ends of radially aligned ones of said poles of said axially spaced-apart stators; and each of said plurality of coils being coaxially wound around a different one of said poles, with pairs of said coils wound around each said diametrically opposite pairs of said poles being electrically coupled in series.

32. The bearing of claim 31, comprising:

means for applying a constant potential difference across each of said pairs of said coils wound around each of said diametrically opposite pairs of said poles of a first one of said stators.

33. The bearing of claim 31, comprising:

means for applying a time-varying potential difference across each of said pairs of said coils wound around each of said diametrically opposite pairs of said poles of a first one of said stators.

34. The bearing of claim 31, comprising:

means for applying a constant potential difference across each of said pairs of said coils wound around each said diametrically opposite pairs of said poles of a first one of said stators; and means for applying a time-varying potential difference across each of said pairs of said coils wound around each said diametrically opposite pairs of said poles of a second one of said stators.

35. The bearing of claim 20, comprising:

said plurality of poles of each of said stators being joined together in a single structure by intermediate webs to form a continuous central circumferential hub perforated by said bore, with each of said poles exhibiting a radial axis extending radially outwardly from said longitudinal axis, and with distal ends of said poles being arcuately spaced-apart and conveying said lines of flux to corresponding ones of said axial flux paths; and said armature means extending between said distal ends of radially aligned said poles of said axially spaced-apart stators;

a first plurality of said plurality of coils being arranged in a first array of diametrically opposite pairs with said coils in each of said first array of diametrically opposite pairs being coupled in electrical series; and a second plurality of said plurality of coils different from said first plurality of coils, being arranged in a second array of diametrically opposite pairs with said coils in each of said second array of diametrically opposite pairs being coupled in electrical series.

36. The bearing of claim 20, comprising:

said plurality of poles of each of said stators being joined together in a single structure by intermediate webs to form a continuous central circumferential hub perforated by said bore, with each of said poles exhibiting a radial axis extending radially outwardly from said longitudinal axis, and with distal ends of said poles being arcuately spaced-apart and conveying said lines of flux to corresponding ones of said axial flux paths; and said armature means extending between said distal ends of radially aligned said poles of said axially spaced-apart stators;

a first plurality of said plurality of coils being wound around different ones of said poles of a single one of said stators, with said first plurality of coils being arranged in a first array of diametrically opposite pairs with said coils in each of said first array of diametrically opposite pairs being coupled in electrical series; and a second plurality of said plurality of coils different from said first plurality of coils, said second plurality of coils being wound around said different ones of said poles of said single one of said stators, with said second plurality of coils being arranged in a second array of diametrically opposite pairs with said coils in each of said second array of diametrically opposite pairs being coupled in electrical series.

37. The bearing of claim 36, comprising:

said single one of said stators being centrally disposed between and axially spaced-apart from a second one of said stators and a third one of said stators.

38. The bearing of claim 36, comprising:

each coil within said first plurality of coils being coaxially positioned with a corresponding one of said coils within said second plurality of coils wound around the same one of said poles.

39. The bearing of claim 20, comprising:

said stators being positioned between and axially separating different pluralities of said plurality of circular coils, said stator having a continuous circular interior circumferential surface defining said bore.

40. The bearing of claim 20, comprising:

a first one of said plurality of stators being positioned between and axially separating a pair of said circular coils;

a second one of said plurality of stators being spaced-apart by a first one of said circular coils from said first one of said stators;

said first one of said plurality of stators having a continuous circular interior circumferential surface defining said bore; and said second one of said stators having a continuous circular interior circumferential surface surrounding said bore.

41. The electromagnetic bearing of claim 20, comprising:

sensing means electrically coupled across a first pair of said plurality of circular coils positioned on diametrically opposite sides of said bore, for providing a position signal indicative of a position of a mass of ferromagnetic material disposed with said bore; and switching means for applying a pulse modulated potential difference across said first pair of said circular coils, with a duty cycle of said pulse modulated potential difference varying in dependence upon said position signal.

42. The electromagnetic bearing of claim 20, comprising:

sensing means electrically coupled across a first pair of said plurality of circular coils positioned on diametrically opposite sides of said bore, for providing a position signal indicative of a position of a mass of ferromagnetic material disposed with said bore;

means for generating a control signal by modifying said position signal in dependence upon a reference signal defining an equilibrium location of the mass within said bore; and switching means for applying a pulse modulated potential difference across said first pair of said circular coils, with a duty cycle of opposite polarities of said pulse modulated potential difference varying in dependence upon said control signal.

* * * * *